United States Patent
Arai

(10) Patent No.: US 7,610,506 B2
(45) Date of Patent: Oct. 27, 2009

(54) DATA PROCESSING SYSTEM, DATA PROCESSING METHOD AND STORAGE APPARATUS

(75) Inventor: Masahiro Arai, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 419 days.

(21) Appl. No.: 11/515,759

(22) Filed: Sep. 6, 2006

(65) Prior Publication Data
US 2008/0005612 A1 Jan. 3, 2008

(30) Foreign Application Priority Data
Jun. 29, 2006 (JP) .............................. 2006-180256

(51) Int. Cl.
*G06F 11/00* (2006.01)
(52) U.S. Cl. .............................. 714/6; 714/5
(58) Field of Classification Search ...................... 714/6, 714/7, 8, 10–13, 42, 54, 710, 718; 711/114, 711/100
See application file for complete search history.

(56) References Cited

U.S. PATENT DOCUMENTS

| | | | | |
|---|---|---|---|---|
| 5,774,643 | A * | 6/1998 | Lubbers et al. ............... | 714/20 |
| 6,275,898 | B1 * | 8/2001 | DeKoning ................... | 711/114 |
| 6,976,187 | B2 * | 12/2005 | Arnott et al. .................... | 714/5 |
| 7,120,826 | B2 * | 10/2006 | Fore et al. ....................... | 714/7 |
| 7,130,973 | B1 * | 10/2006 | Chong et al. ................. | 711/162 |
| 2002/0073297 | A1 | 6/2002 | Mizuno et al. | |
| 2003/0088803 | A1 | 5/2003 | Arnott et al. | |
| 2005/0108475 | A1 | 5/2005 | Yamamoto | |

FOREIGN PATENT DOCUMENTS

| | | |
|---|---|---|
| EP | 0462917 | 12/1991 |
| EP | 0518603 | 12/1992 |
| JP | 07-146760 | 6/1995 |
| JP | 2002-157093 | 5/2002 |
| JP | 2002-236560 | 8/2002 |
| JP | 2002-297322 | 10/2002 |
| JP | 2003-186630 | 7/2003 |
| JP | 2005-099995 | 4/2005 |
| JP | 2005-149374 | 6/2005 |
| WO | WO 2006/050455 | 11/2006 |

OTHER PUBLICATIONS

European Search Report, EP 06255935, dated Jun. 19, 2008.
David A. Patterson, Garth Gibson and Randy H. Katz, ":A Case for Redundant Arrays of Inexpensive Disks(Raid)" Raid pp. 109-116; Jun. 1988.

* cited by examiner

*Primary Examiner*—Dieu-Minh Le
(74) *Attorney, Agent, or Firm*—Antonelli, Terry, Stout & Kraus, LLP.

(57) ABSTRACT

A compact data processing system suitable for long-term use that enables the maintenance of failure resistance without having to mount many spare disks or replace disks; a data processing method; and a storage apparatus for this data processing system are provided. In the data processing system, which has a host system and a storage apparatus that provides first memory areas for storing data read/written by the host system, the storage apparatus has a reservation unit that dynamically reserves one of the first memory areas as a spare second memory area when a failure occurs in any one of the first memory areas and there is no spare second memory area to migrate the data stored in that faulty memory area to.

21 Claims, 26 Drawing Sheets

FIG.7

| DISK No. | CAPACITY | STATUS | RAID GROUP No. |
|---|---|---|---|
| 0 | 500GB | NORMAL | 0 |
| 1 | 500GB | NORMAL | 0 |
| 2 | 500GB | NORMAL | 0 |
| 3 | 500GB | NORMAL | 0 |
| 4 | 500GB | NORMAL | 0 |
| 5 | 500GB | NORMAL | -1 (SPARE) |
| 6 | 500GB | NORMAL | 1 |
| ... | ... | ... | ... |
| N | - | YET-TO-BE-MOUNTED | - |

DISK MANAGEMENT SCREEN

| DISK No. | CAPACITY | STATUS | RAID GROUP No. |
|---|---|---|---|
| 0 | 500GB | NORMAL | 0 |
| 1 | 500GB | NORMAL | 0 |
| 2 | 500GB | NORMAL | 0 |
| 3 | 500GB | NORMAL | 0 |
| 4 | 500GB | NORMAL | 0 |
| 5 | 500GB | NORMAL | SPARE |
| 6 | 500GB | NORMAL | 1 |
| ... | ... | ... | ... |

OK

HELP

| RAID GROUP No. | RAID LEVEL | NUMBER OF DATA DISKS | EFFECTIVE CAPACITY | STATUS | LU-ALLOCATED CAPACITY | NON-ALLOCATED CAPACITY |
|---|---|---|---|---|---|---|
| 0 | RAID-5 | 4 | 2000MB | NORMAL | 900GB | 1100GB |
| 1 | RAID-6 | 3 | 1500MB | NORMAL | 1000GB | 500GB |
| ... | ... | ... | ... | ... | ... | ... |

| LU No. | CAPACITY | RAID GROUP No. | START LBA | END LBA |
|---|---|---|---|---|
| 0 | 100GB | 0 | 00000000h | 0000F000h |
| 1 | 300GB | 0 | 00010000h | 0003F000h |
| 2 | 500GB | 0 | 00040000h | 0008F000h |
| ... | ... | ... | ... | ... |

| SPARE LU No. | CAPACITY | RAID GROUP No. | START LBA | END LBA | USAGE STATUS |
|---|---|---|---|---|---|
| 0 | 500GB | 0 | 00000000h | 0004F000h | UNUSED |
| ... | ... | ... | ... | ... | ... |

| ACCESS SOURCE LU No. | ACCESS SOURCE LBA | SPARE LU No. | ACCESS DESTINATION LBA |
|---|---|---|---|
| ... | ... | ... | ... |
| 1 | 00356780h | 1 | 10004780h |
| 1 | 00356790h | 1 | 10004790h |
| ... | ... | ... | ... |

| EXTENT No. | RAID GROUP No. | START LBA | ALLOCATION |
|---|---|---|---|
| 0 | 0 | 00000000h | ALLOCATED |
| 1 | 0 | 00000400h | ALLOCATED |
| 2 | 0 | 00000800h | NOT-ALLOCATED |
| ... | ... | ... | ... |

| | |
|---|---|
| NUMBER OF EXTENTS ALLOCATED TO USER AREAS | 200,000,000,000 |
| NUMBER OF EXTENTS ALLOCATED TO SPARE AREAS | 0 |
| NUMBER OF UNUSED EXTENTS | 700,000,000,000 |
| TOTAL NUMBER OF EXTENTS | 900,000,000,000 |

| VIRTUAL LU No. | LBA | EXTENT No. |
|---|---|---|
| ... | ... | ... |
| 0 | 00356780h | 0 |
| 0 | 02466790h | 1 |
| ... | ... | ... |

| SPARE LU No. | START LBA | EXTENT No. |
|---|---|---|
| ... | ... | ... |
| 0 | 00356780h | 1800 |
| 0 | 00356790h | 8310 |
| ... | ... | ... |

DATA PROCESSING SYSTEM, DATA PROCESSING METHOD AND STORAGE APPARATUS

CROSS-REFERENCES TO RELATED APPLICATIONS

This application relates to and claims priority from Japanese Patent Application No. 2006-180256, filed on Jun. 29, 2006, the entire disclosure of which is incorporated herein by reference.

BACKGROUND

1. Field of the Invention

The invention relates to a RAID (Redundant Array of Inexpensive Disks) configuration-adopting data processing system, data processing method, and storage apparatus; particularly to a data processing system, data processing method and storage apparatus where some or all disk drives (hereinafter simply referred to as 'disks') are non-replaceably mounted.

2. Description of Related Art

Conventionally, there have been storage apparatuses where RAID configurations are adopted as prevention measure against data loss resulting from disk failures (see, for example, the non-patent document "A Case for Redundant Arrays of Inexpensive Disks (RAID)" by David A. Patterson, Garth Gibson, and Randy H. Katz, University of California Berke.). There also have been storage apparatuses including spare disks for instant RAID recovery from disk failures (see, for example, Japanese Patent Laid-Open Publication No. 1995-146760).

The foregoing storage apparatuses are based on the premise that faulty disks are replaced by built-in spare disks and new spare disks are added in the event of disk failures. Accordingly, with storage apparatuses incapable of disk replacement (hereinafter called 'non-replaceable disk storage apparatuses', there is a problem in that spare disks cannot be added and failure resistance degrades.

Although it is possible to mount as many spare disks as possible in non-replaceable disk storage apparatuses, it increases the cost and the size of the storage apparatuses.

This invention aims to provide a compact data processing system suitable for long-term use and capable of maintaining failure resistance without replacing disks or having to mount many spare disks; and a data processing method and storage apparatus for the data processing system.

SUMMARY

In order to achieve the foregoing goal, this invention provides a data processing system having a host system; and a storage apparatus that provides one or more first memory areas storing data read/written by the host system. The storage apparatus includes a reservation unit that dynamically reserves one of the first memory areas as a spare second memory area when a failure occurs in any one of the first memory areas and there is no spare second memory area to migrate the data in that faulty first memory area to.

With the data processing system according to this invention, because a spare memory area can be dynamically reserved from among the memory areas of existing disks, the data processing system can be compact, can be used for a long time, and its failure resistance can be maintained.

This invention also provides a data processing method performed in a data processing system having a host system; and a storage apparatus that provides one or more first memory areas for storing data read/written by the host system. This the method includes a step where the storage apparatus dynamically reserves one of the first memory areas as a spare second memory area when a failure occurs in any one of the first memory areas and there is no spare second memory area to migrate the data stored in that faulty first memory area to.

With the data processing method according to this invention, because a spare memory area can be dynamically reserved from among the memory areas of existing disks, failure resistance can be maintained for a compact data processing system suitable for long-term use.

This invention further provides a storage apparatus that provides one or more first memory areas for storing data read/written by a host system. The storage apparatus includes a reservation unit that dynamically reserves one of the first memory areas as a spare second memory area when a failure occurs in any one of the first memory areas and there is no spare second memory area to migrate the data in that faulty first memory area to.

According to this invention, because a spare memory area can be dynamically reserved from among the memory areas of existing disks, a storage apparatus can be compact and used for a long time and the failure resistance can be maintained.

According to this invention, spare disks or spare areas can be reserved without mounting many disks or replacing disks, thereby enabling the maintenance of the failure resistance of a compact data processing system or storage apparatus suitable for long-term use.

Also, even when there is a possibility of not being able to maintain the failure resistance (e.g., when no spare disk or spare area can be reserved) a notification that a replacement storage apparatus has to be prepared is performed.

BRIEF DESCRIPTION OF THE DRAWINGS

FIG. 7 is an explanatory diagram showing a disk information management table according to Embodiment 1 of this invention.

FIG. 8 shows an example of a viewing screen shown on the display of a management terminal according to Embodiment 1 of this invention.

FIG. 9 is an explanatory diagram showing a RAID group information management table according to Embodiment 1 of this invention.

FIG. 10 is an explanatory diagram showing an LU information management table according to Embodiment 1 of this invention.

FIG. 25 is an explanatory diagram of a spare LU management table according to Embodiment 3 of this invention.

FIG. 26 is an explanatory diagram of a LBA-LBA conversion table according to Embodiment 3 of this invention.

FIG. 30 is an explanatory diagram of an extent management table according to Embodiment 4 of this invention.

FIG. 31 is an explanatory diagram of a number-of-extents management table according to Embodiment 4 of this invention.

FIG. 32 is an explanatory diagram for an virtual LU/access destination extent correspondence table according to Embodiment 4 of this invention.

FIG. 33 is an explanatory diagram for a spare LU/access destination extent correspondence table according to Embodiment 4 of this invention.

DETAILED DESCRIPTION OF PREFERRED EMBODIMENTS

Embodiments 1 to 4 of this invention are explained below with reference to the attached drawings.

1. Embodiment 1

Figure 1:
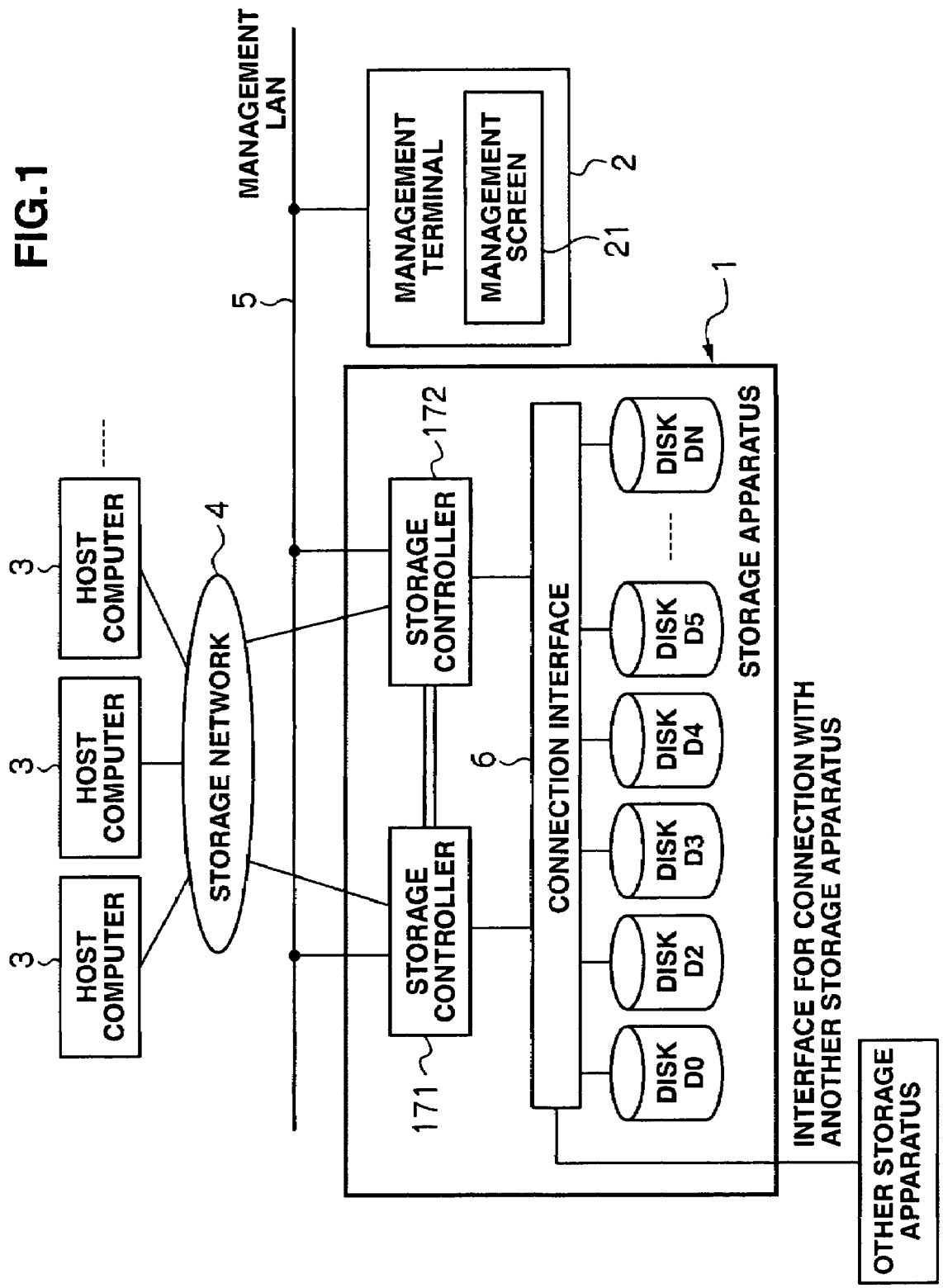
FIG. 1 shows the structure of a storage apparatus according to this invention.

FIG. 1 shows the structure of a storage apparatus according to Embodiments 1 to 4 of this invention. The storage apparatus 1 is connected to a management terminal 2 via a management LAN 5. It is also connected to a plurality of host computers 3 via a storage network 4. It has a connection interface 7 for connection with a replacement storage apparatus.

The storage apparatus 1 also has storage controllers 171 and 172 so that a large amount of data can be input/output from/to the storage network at a time.

Incidentally, there may be any number of storage controllers, depending on the type of embodiment.

The storage apparatus 1 also includes a plurality of disks D0, D1, D2 ... DN. The storage controllers 171 and 172 are connected to these disks D0 to DN via a connection interface 6. Accordingly, the storage controllers 171 and 172 and disks D0 to DN input/output data to each other. The connection between the storage controllers 171 and 172 and disks D0 to DN may be realized by a communication path appropriate for data transfer, such as SATA (Serial ATA), SAS (Serial Attached SCSI), or Fibre Channel.

A control program operating in the storage controllers 171 and 172 controls the input/output of data to/from the disks D0 to DN. The storage controllers 171 and 172 manage the RAID configuration of the disks D0 to DN. They also communicate with the management terminal 2 and send/receive various kinds of data to/from it.

The disks D0 to DN can be connected to the storage controllers via SATA, SAS, or Fibre Channel.

The management terminal 2 is a computer having a CPU, memory, memory device, interface, input device, and display. Based on a management program operating inside, the management terminal 2 recognizes the operation status of the storage apparatus 1 and controls its operation. Incidentally, a client program such as a Web browser may also operate on the management terminal 2 so that the management terminal 2 can control the operation of the storage apparatus 1 based on a management program (Common Gateway Interface or Java (registered trademark) etc.) provided by the storage apparatus 1.

The viewing screen 21 is displayed on the display in the management terminal 2.

The host computers 3 are host systems each having a CPU, memory, memory device and interface; and make database services and web services available using the data supplied from the storage apparatus 1.

The storage network 4 enables communication using protocols appropriate for data transfer, such as SAS protocol and Fibre Channel protocol.

The management LAN 5 can transmit data and control information between computers using TCP/IP (Transmission Control Protocol/Internet Protocol) and an example of the management LAN 5 is an Ethernet (registered trademark) LAN.

Figure 2:
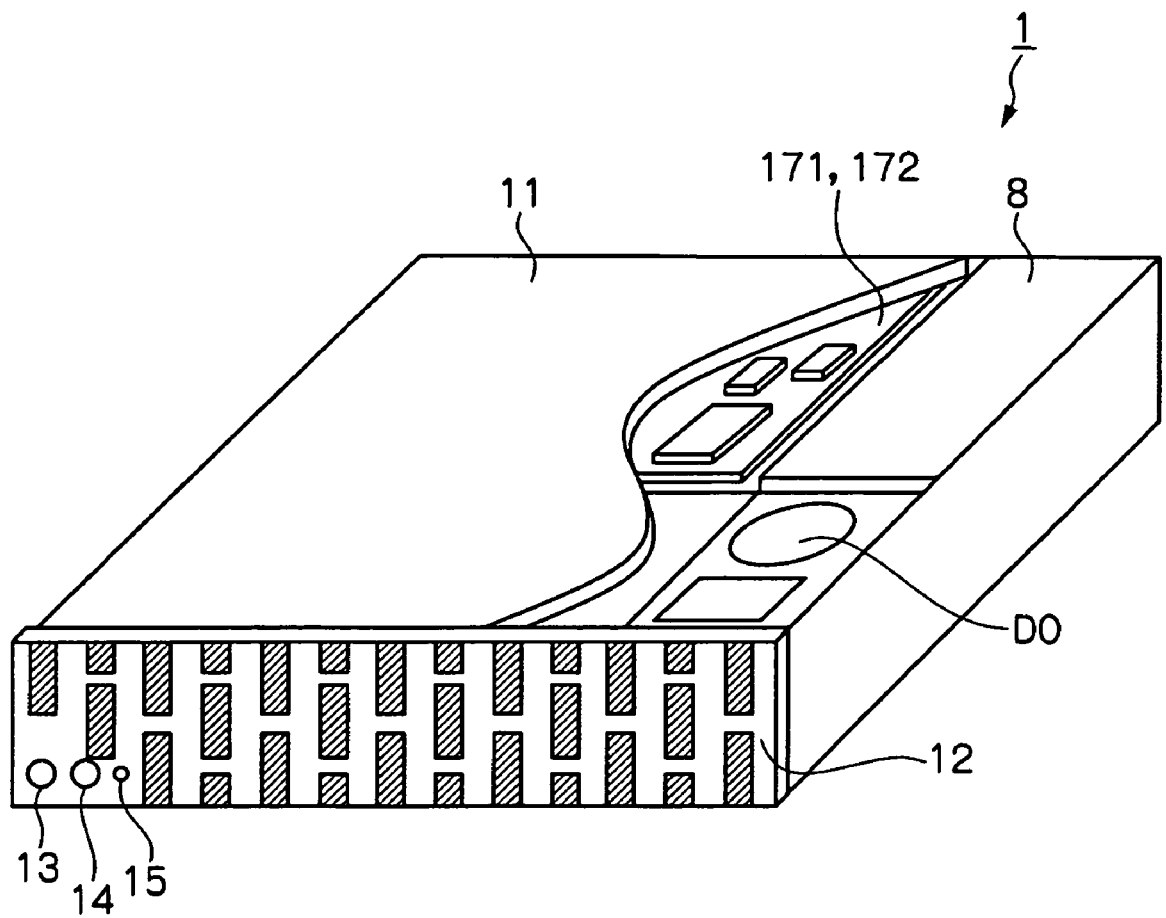
FIG. 2 is an external view of the structure of the storage apparatus according to Embodiment 1 of this invention.

FIG. 2 is an overview of the structure of the storage apparatus 1 according to Embodiment 1 of this invention. The storage controllers 171 and 172, disks D0 to DN, fans and power supply 8 are located inside the case of the storage apparatus 1 and covered with a top board 11 (in FIG. 2, the top board is partially cut away to show the internal structure). The disks D0 to DN are mounted in the storage apparatus 1 and cannot be replaced.

The front face of the storage apparatus 1 is covered with a bezel 12 having a plurality of inlets. This bezel 12 also has power buttons 13 and 14 for powering on/off the storage apparatus 1 and a beep-stopping button 15 for stopping the beeping sound of a buzzer that starts when a failure occurs.

Incidentally, although not shown in FIG. 2, the front face may have some access LEDs showing the access statuses of the respective disks.

Figure 3:
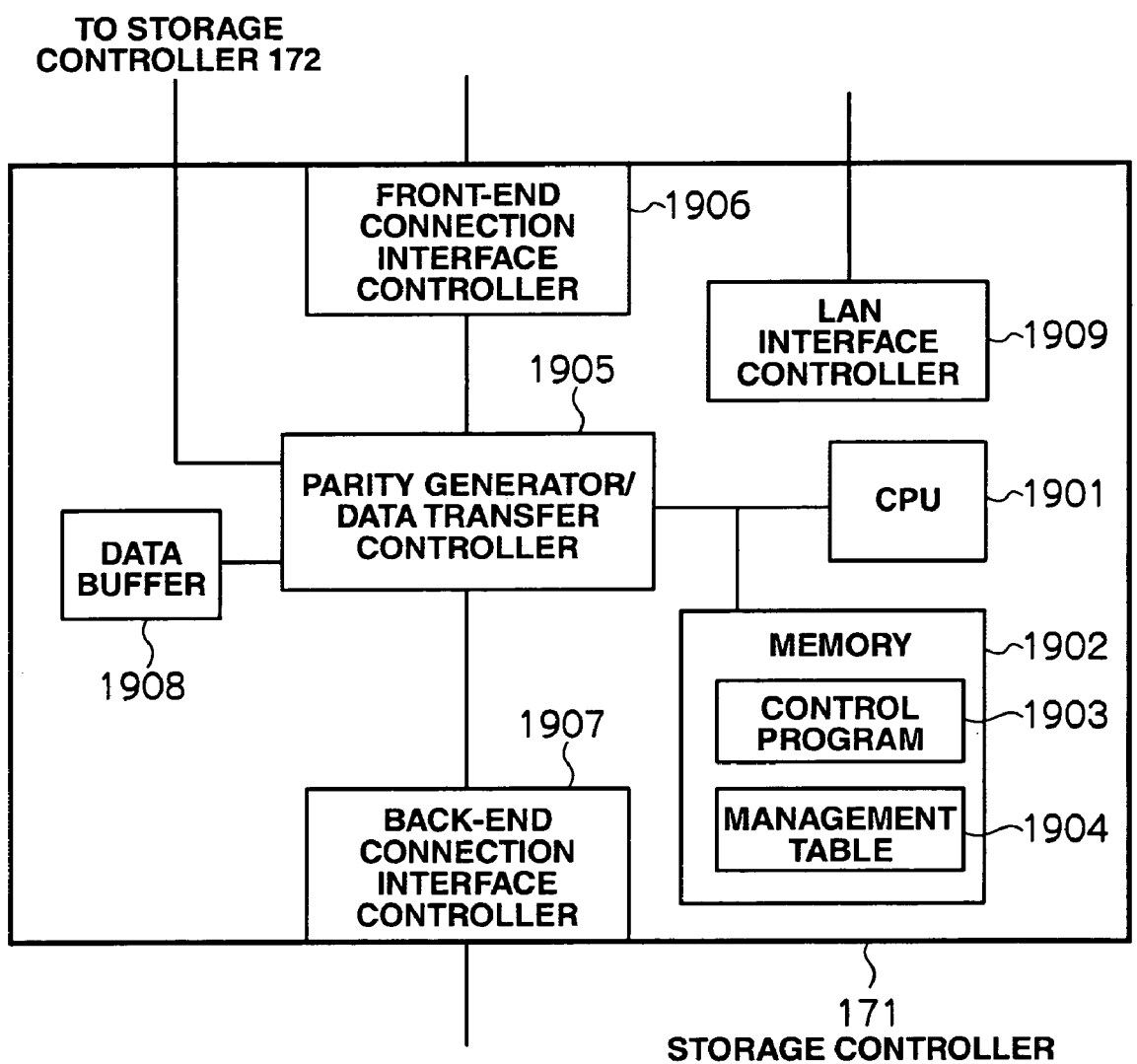
FIG. 3 is a block diagram showing the internal structure of a storage controller according to Embodiment 1 of this invention.

FIG. 3 is a block diagram showing the internal structure of the storage controller 171 according to Embodiment 1 of this invention. Incidentally, the storage controller 172 has the same structure.

The storage controller 171 has a CPU 1901, memory 1902, parity generator/data transfer controller 1905, data buffer 1908, front-end connection interface controller 1906, backend connection interface controller 1907, and LAN interface controller 1909. These components are connected to one another via data transfer paths that are suitably mounted in the storage controller.

The CPU 1901 reads a control program 1903 and management table 1904 stored in the memory 1902 and executes various kinds of controls in the storage apparatus 1.

Based on instructions from the CPU 1901, the parity generator/data transfer controller 1905 transfers data between the memory 1902, front-end connection interface controller 1906, backend connection interface controller 1907, and data buffer 1908. It also calculates parity for predetermined data using the data buffer 1908.

The front-end connection interface 1906 controls the data input/output between the host computers 3 shown in FIG. 1 and the storage apparatus 1 and stores/fetches data in/from the data buffer 1908 as necessary.

The backend connection interface 1907 inputs/outputs data to/from the disks D0 to DN and stores/fetches data in/from the data buffer 1908 as necessary.

The data buffer 1908 is memory composed of, for example, DIMMs (Dual Inline Memory Modules) etc. and is made to be non-volatile using batteries etc.

The LAN interface controller 1909—an interface controller—and the management terminal 2 input/output data and control information to each other.

The storage controller 172 in Embodiment 1 has the same structure as the foregoing storage controller 171, therefore its explanation has been omitted. Also, the block configuration in the storage controller shown in FIG. 3 is merely an example and these blocks may be realized by hardware or software as long as they provide the same functions. Different block configurations can also be adopted.

Figure 4:
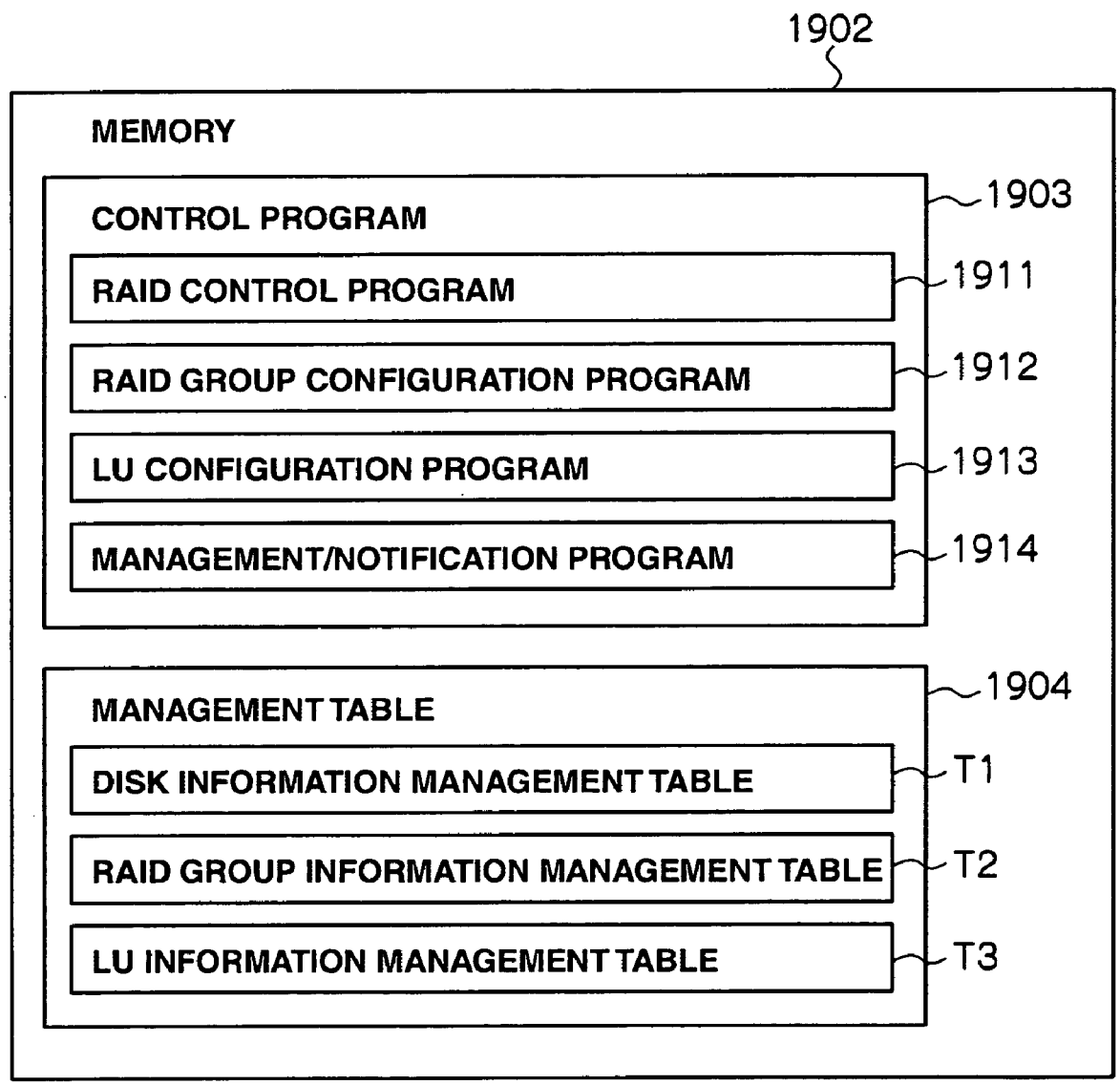
FIG. 4 is an explanatory diagram showing a control program and management table stored in memory according to Embodiment 1 of this invention.

FIG. 4 is an explanatory diagram showing a control program 1903 and management table 1904 stored in the memory 1902.

The control program 1903 is composed of a RAID control program 1911, RAID group configuration program 1912, LU configuration program 1913 and management/notification program 1914.

The management table 1904 is composed of a disk information management table T1, RAID group information management table T2, and LU information management table T3.

Based on the control program 1903 and management table 1904, the CPU 1901 processes data input/output from/to the host computer 3 and sends/receives data to/from the disks D0 to DN. The CPU 1901 carries out failure recovery processing based on the control program 1903 and management table 1904.

Based on the instructions from the management terminal 2 and CPU 1901, the RAID group configuration program 1912 creates/deletes a RAID group or makes a change in a RAID group using the RAID group information management table T2.

Based on the instructions from the management terminal 2 and CPU 1901, the LU group configuration program 1913 creates/deletes an LU or makes a change in an LU using the LU information management table T3.

The management/notification program 1914 sends/receives data and control information to/from the management terminal 2.

The disk information management table T1 stores various kinds of information for the disks D0 to DN. The RAID group information management table T2 stores various kinds of information for RAID groups composed of the disks D0 to DN. The LU information management table T3 stores various kinds of information for LUs (logical units), which are logical disks set for RAID group.

Figure 5:
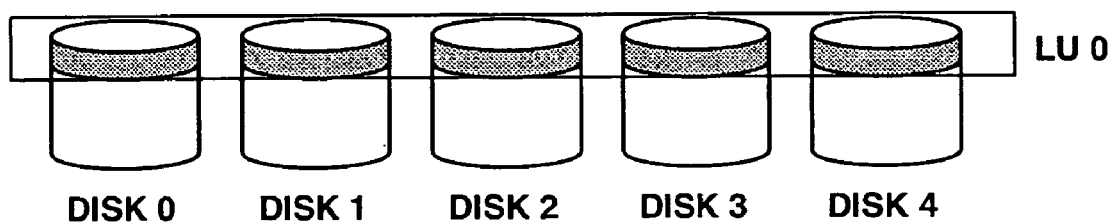
FIG. 5 is a diagram schematically showing the relationships between a RAID group, disks and LUs according to Embodiment 1 of this invention.

FIG. 5 is a diagram schematically showing the relationships between a RAID group, disks and LUs, for helping the understanding of the following descriptions. RAID groups are volumes formed when a plurality of physical disks (D0 to DN in FIG. 1) form RAID structures of an arbitrary level (e.g., RAID-5), and each RAID structure is regarded as one volume. In the example shown in FIG. 5, a RAID structure is formed using the disks D0 to D4 in FIG. 1 as disk 0, 1, 2, 3, 4 and this volume (RAID group) has a label 'RAID group 0.'

LUs are volumes made by logical dividing a RAID group into a plurality of sections. The host computers see the respective LUs as disks so the LUs are also called logical disks.

In the example shown in FIG. 5, a part of the RAID group 0 constitutes LU0.

Figure 6:
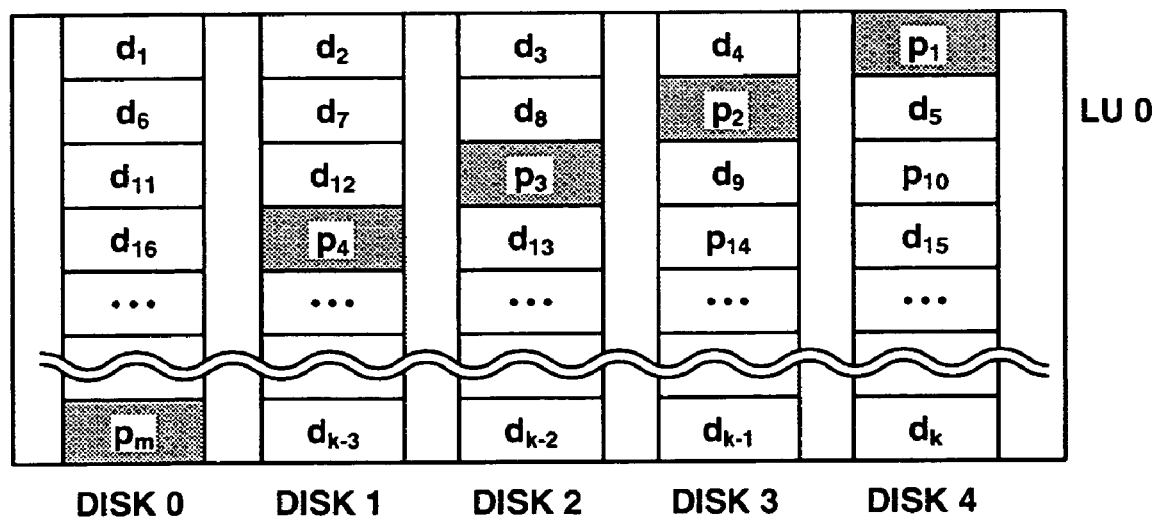
FIG. 6 is an explanatory diagram showing the storage statuses of physical disks according to Embodiment 1 of this invention.

FIG. 6 is an explanatory diagram showing how data is stored in the physical disks. It shows the situation where the data in LU0 is stored in the RAID groups based on RAID-5 configuration. The data is stored in structural units called stripe blocks, each composed of one or more sectors. The codes 'd1,' 'd2' . . . indicate the pieces of data stored in stripe block units and the codes 'p1,' 'p2,' . . . indicate parities created for each stripe row—a horizontal row of stripe blocks—by calculation using d1, etc.

In the RAID-5 configuration, parity blocks are located in the respective disks. Accordingly, the parity blocks are stored in a staggered fashion, for example, the parity block in the first row is stored in the disk 4 and the parity block in the second row is stored in the disk 3.

FIG. 7 is an explanatory diagram for the disk information management table T1 according to Embodiment 1 of this invention. This table T1 stores various kinds of information for the disks D0 to DN. More precisely, it stores the disk numbers, capacities and statuses of the disks (whether they are 'normal,' 'faulty,' or 'yet-to-be-mounted') and the RAID group numbers of the RAID groups they belong to. For example, the disk having the disk number 1 has a capacity of 500 GB, is in the 'normal' state, and belongs to the RAID group 0.

Incidentally, if the number entered in the RAID group number field for a disk is 0 or a positive integer, it means that the disk belongs to the RAID group having that RAID group number; however, if the entered number is −1, it means that the disk is a spare disk; if the entered number is −2, it means that the disk is a faulty disk; and if the entered number is −3, it means that the disk is not being used.

The disk information management table T1 is stored in the memory 1902 and its content can be checked via the management terminal 2.

FIG. 8 shows an example of a disk management viewing screen V1 shown on the display in the management terminal 2, showing the disk information managed in the disk information management table T1. The user can know at any time the usage statuses of the disks via this the disk management viewing screen V1.

FIG. 9 is an explanatory diagram showing the RAID group information management table T2 according to Embodiment 1 of this invention. This table T2 stores information for the RAID groups composed of the disks D0 to DN. More precisely, it stores RAID group numbers, RAID levels, the number of data disks included in each RAID group (the number of disks other than parity disks), effective capacity of each RAID group (the capacity data can actually be written), the status of each RAID group (whether it is 'normal,' 'degenerat' or 'broken'), the capacities allocated to LU(s), and the non-allocated capacities. Incidentally, degeneration is a failure a RAID group can be recovered from, more specifically, degeneration is the case where the number of failure disks is smaller than the number of parity disks in the RAID group. Breakage is a failure a RAID group cannot be recovered from. The RAID group 0, for example, adopts a RAID level 5 (RAID-5) configuration, has four data disks, its effective capacity is 2000 GB, its status is 'normal,' the LU-allocated capacity is 900 GB, and the non-allocated capacity is 1100 GB.

The RAID group information management table T1 is stored in the memory 1902 and its content can be checked via the management terminal 2.

FIG. 10 is an explanatory diagram for the LU information management table T3 according to Embodiment 1 of this invention. This table T3 stores information for LUs set for the respective RAID groups. More precisely, it stores, for each LU, its LU number, allocated capacity, allocation source RAID group, allocation start logical block address (hereinafter called LBA), and end LBA. For example, the LU having the LU number 0 has a capacity of 100 GB, is set for RAID group 0, its start LBA is 00000000h and end LBA is 0000F000h. LBAs are unique addresses assigned to the foregoing stripe blocks at predetermined intervals.

The LU information management table T3 is, like the disk information management table T1, stored in the memory 1902 and can be checked via the management terminal 2.

Figure 11:
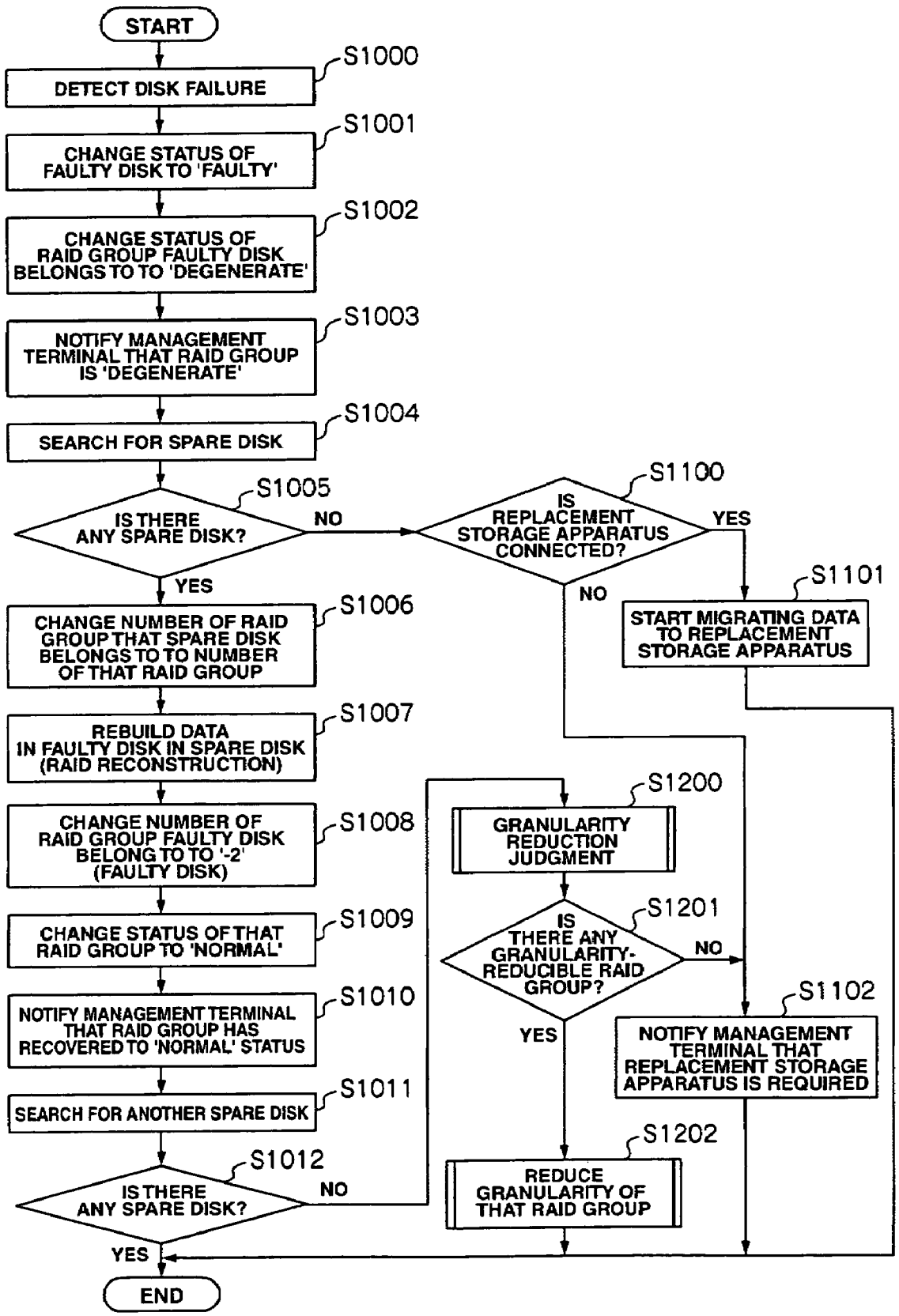
FIG. 11 is a flowchart showing failure recovery and next-spare-disk reservation processing performed when a disk failure occurs, according to Embodiment 1 of this invention.

FIG. 11 is a flowchart showing failure recovery and next-spare-disk reservation processing the CPU 1901 performs based on the control program 1903 and management table 1904 when a disk failure occurs.

More specifically, for example, when the CPU 1901 detects a disk failure, such as when data reading or writing from/in the disk is impossible, the disk is powered off, or the number of times that data is unable to be read from the disk exceeds a threshold value (S1000), it changes the status of that disk to 'faulty' in the disk information management table T1 (S1001). The CPU 1901 also changes the status of the RAID group the faulty disk belongs to to 'degenerate' in the RAID group information management table T2 (S1002). Then, it calls the management/notification program 1914 and notifies the management terminal 2 that the disk has a problem and the RAID group is 'degenerate' (S1003).

The CPU 1901 then searches for a spare disk in the storage apparatus, by referring to the disk management information table T1 (S1004). If there is a spare disk (S1005: Yes), it changes the number '-1' (spare disk) entered in the RAID group number field in the disk information management table T1 to the number of the faulty RAID group (S1006) and rebuilds the content of the faulty disk in this spare disk. In other words, the CPU 1901 reconstructs the RAID structure (S1007).

Once the reconstruction is complete, the CPU 1901 changes the number of the RAID group the faulty disk belongs to to '-2' (faulty disk) in the disk information management table T1 (S1008). Then, it changes the status of the RAID group from 'degenerate' to 'normal' in the RAID group information management table T2 (S1009).

Then, the CPU 1901 calls the management/notification program 1914 and notifies the management terminal 2 that the RAID group has recovered to a normal state (S1010).

Next, the CPU 1901 carries out second spare disk search in order to search for another spare disk in the storage apparatus 1 (S1011). If there is another spare disk (S1012: Yes), the CPU 1901 finishes the failure recovery processing.

Meanwhile, if no spare disk is found in the first spare disk search (S1005: No), the CPU 1901 checks whether an external replacement storage apparatus is connected to the storage apparatus 1. If one is (S1110: Yes), the CPU 1901 starts migrating the data to that external replacement storage apparatus. If one isn't (S1100: No), the CPU 1901 calls the management/notification program 1914 and notifies the management terminal 2 that a replacement storage apparatus is required (S1102), and finishes the failure recovery processing.

If no spare disk is found in the second spare disk search (S1012: No), the CPU 1901 judges whether there is a granularity-reducible RAID group, by referring to the disk information management table T1 and RAID group information management table T2 (S1200).

If there is a granularity-reducible RAID group (S1201: Yes), the CPU 1901 reduces the granularity of the first-found RAID group or the RAID group for which a high priority has been set by the management terminal 2 (S1202), and then finishes the failure recovery processing.

If there is no granularity-reducible RAID group (S1201: No), the CPU 1901 calls the management/notification program 1914 and notifies the management terminal 2 that a replacement storage apparatus is required (S1102), and finishes the failure recovery processing.

Figure 12:
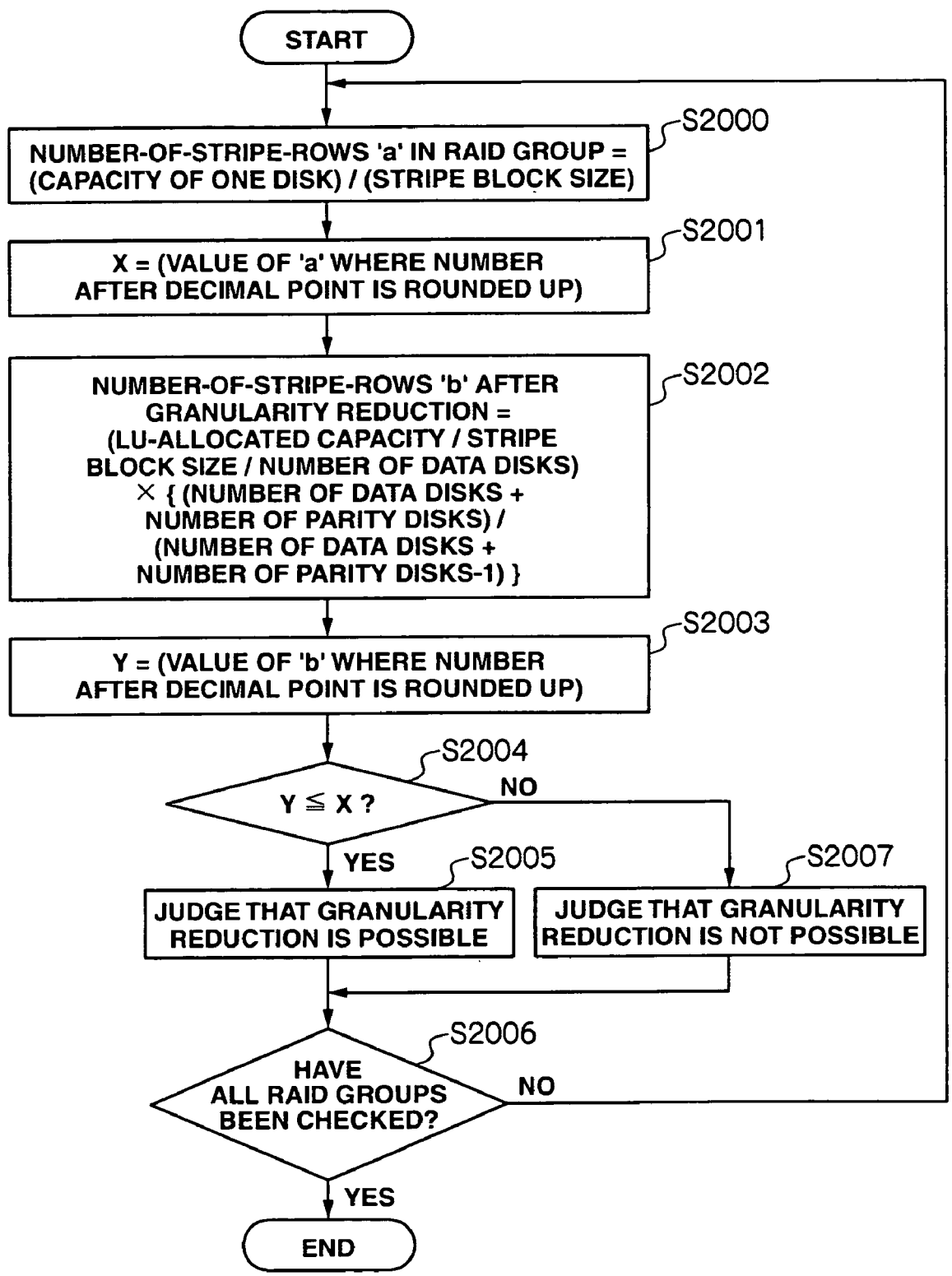
FIG. 12 is a flowchart showing granularity reduction judgment according to Embodiment 1 of this invention.

FIG. 12 is a flowchart showing the granularity reduction judgment the CPU 1901 carries out based on the control program 1903 and management table 1904, according to Embodiment 1 of this invention. Granularity reduction is processing to migrate data stored in stripe blocks and parity blocks in order to reduce the number of data disks in the RAID structure. In Embodiment 1, granularity reduction means, for example, changing the RAID-5 configuration from 4D+1P to 3D+1P. The relevant processing is explained below with reference to the flowchart.

More specifically, the CPU 1901 calculates the number of rows 'a' existing in a target RAID group using the formula 'a'=(the capacity of one disk)/(stripe block size) (S2000). Here, the capacity of one disk is the physical capacity of one disk in the RAID group and the stripe block size is a constant previously set by the CPU 1901. The number of stripe rows 'a' is a value which may include a decimal number, so the CPU 1901 rounds up the number after the decimal point and sets the value—integer—as a variable X (S2001).

The CPU 1901 then calculates the number of stripe rows 'b' after the granularity reduction using the formula 'b'=(current number of rows) multiplied by (increase rate). In other words, the number of stripe rows 'b' is obtained by the formula 'b'=(LU-allocated capacity/stripe block size/number of data disks) multiplied by {(number of data disks+number of parity disks)/(number of data disks+number of parity disks −1)} (S2002). Here, the number of parity disks is a value automatically set depending on the RAID level of the RAID group, so if the RAID group is based on RAID-5 configuration, the number of parity disks is 1. The number of stripe rows 'b' is a value that may include decimal numbers, so the CPU 1901 rounds up the number after the decimal point and sets the value—integer—as Y (S2003).

The CPU 1901 then compares X and Y and if Y≦X (S2004: Yes), it judges that granularity reduction is possible (S2005). Meanwhile, if Y>X (S2004: No), it judges that granularity reduction is not possible (S2007).

The CPU 1901 then judges whether all the RAID groups have been checked (S2006) and if the judgment is positive (S2006: Yes), it completes the processing. If the judgment is negative (S2006: No), it carries out the same judgment processing for the next RAID group.

Figure 13:
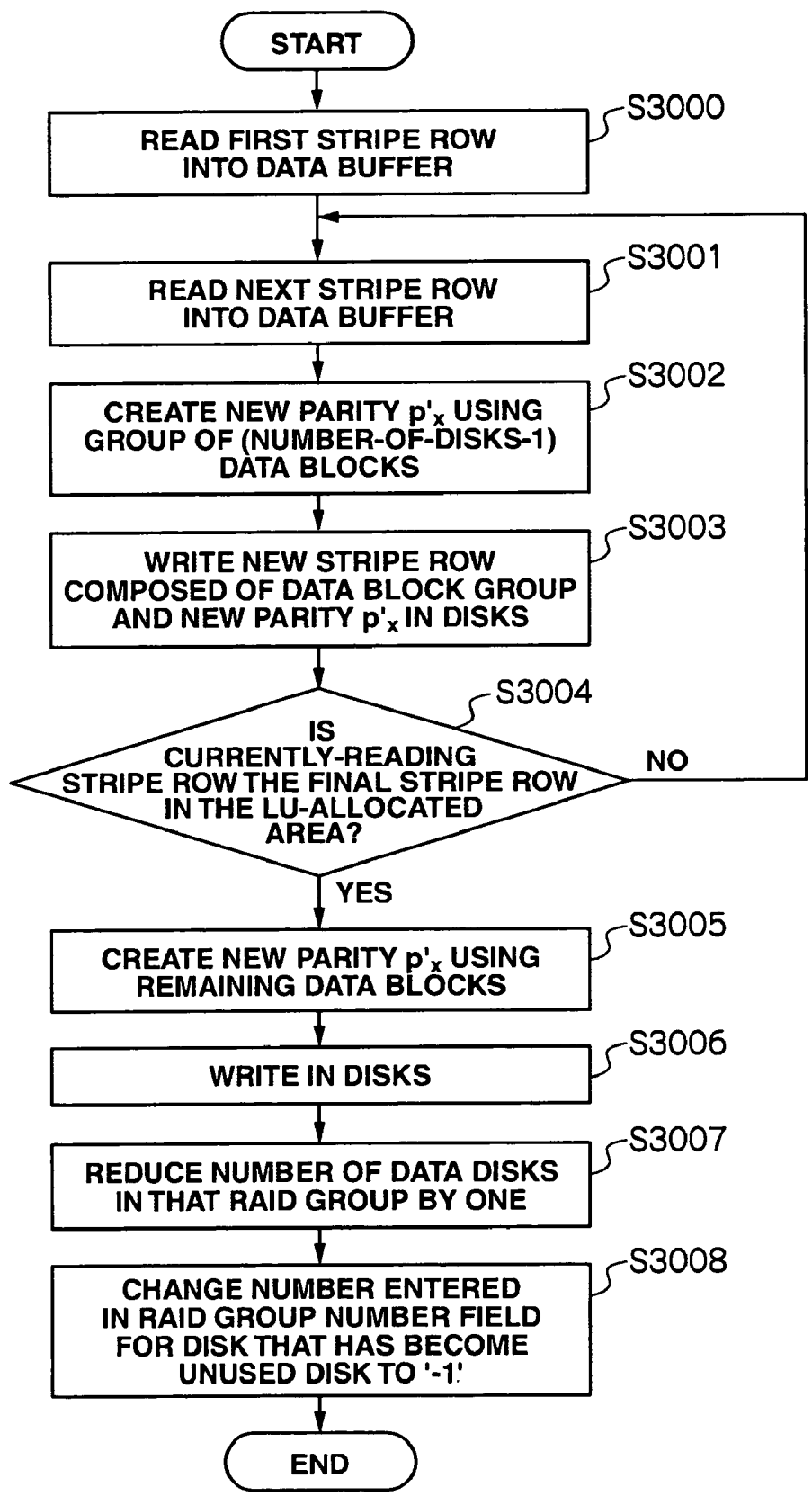
FIG. 13 is a flowchart showing a granularity reduction processing routine according to Embodiment 1 of this invention.

FIG. 13 is a flowchart showing a granularity reduction routine the CPU 1901 performs based on the control program 1903 and management table 1904, according to Embodiment 1 of this invention.

Figure 17:
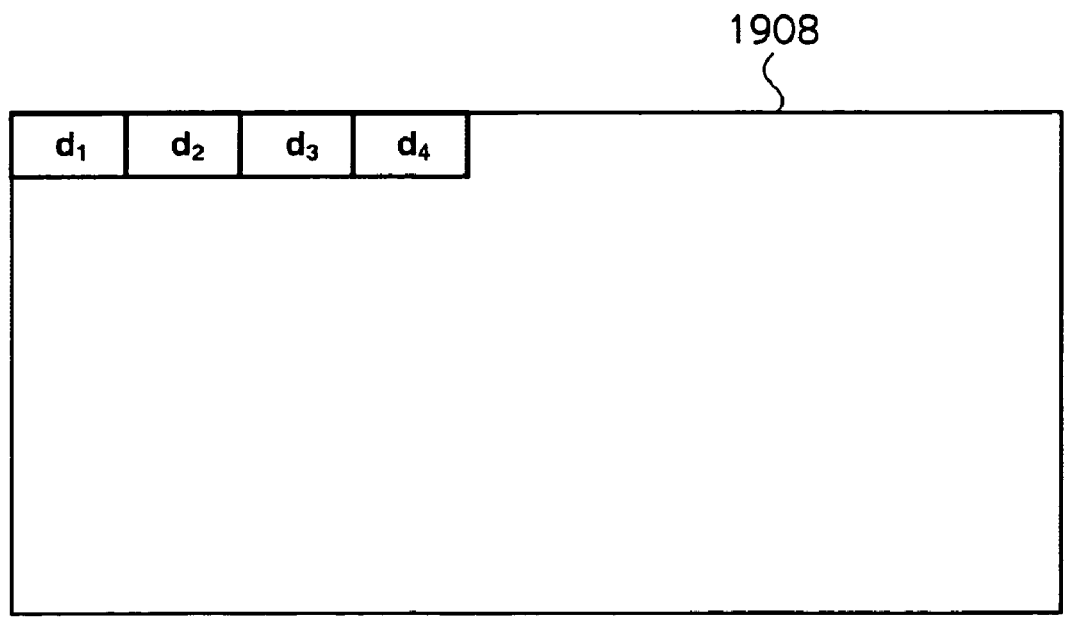
FIG. 17 is a diagram showing the state where the data blocks in the first stripe row are read into a data buffer by the granularity reduction processing according to Embodiment 1 of this invention.
Figure 18:
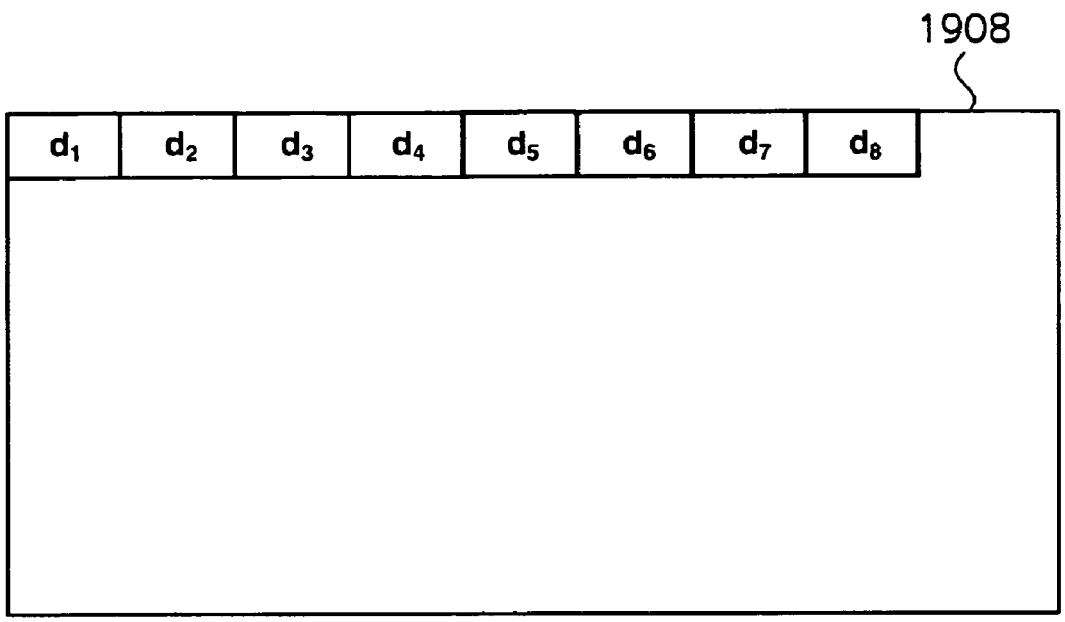
FIG. 18 is a diagram showing the state where the data blocks in the next stripe row are read into the data buffer by the granularity reduction processing according to Embodiment 1 of this invention.
Figure 19:
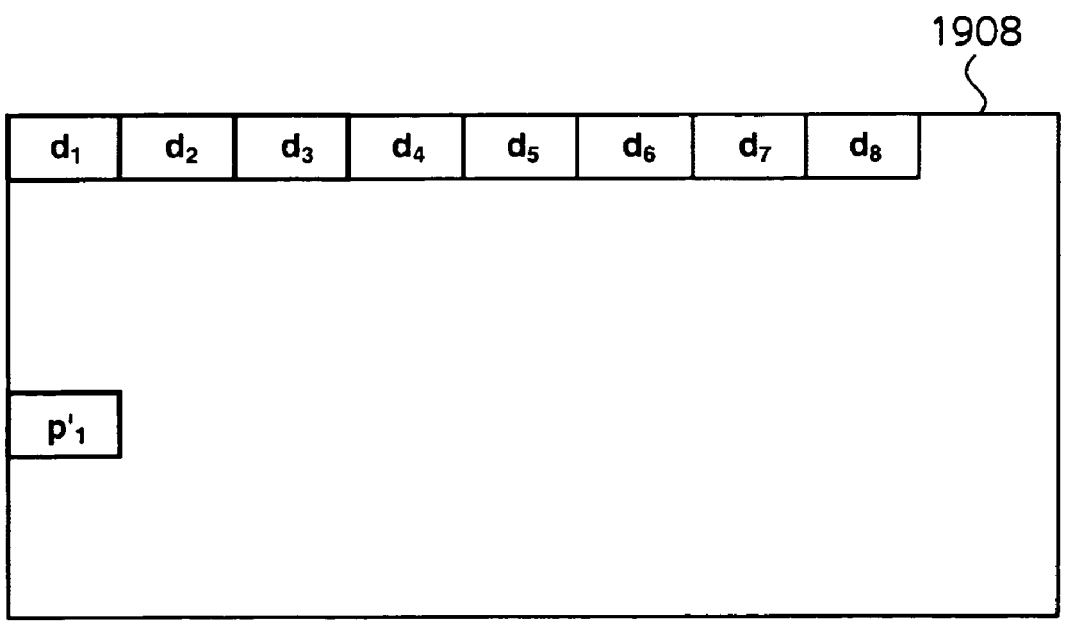
FIG. 19 is a diagram showing the state where new parity is created in the data buffer according to Embodiment 1 of this invention.

The CPU 1901 reads the data blocks in the first stripe row from the disks constituting a target RAID group to the data buffer 1908 (S3000). For example, as shown in FIG. 17, the CPU 1901 reads the data blocks d1 to d4 to the data buffer 1908. Then, it reads the data blocks in the next stripe row to the data buffer 1908 (S3001). For example, as shown in FIG. 18, it reads the data blocks d5 to d8 to the data buffer 1908. Then, it creates new parity p'x using (number-of-disks −1) data blocks from among the data blocks in the data buffer 1908 (S3002). For example, as shown in FIG. 19, the CPU 1901 creates new parity p'1 using (number-of-data disks (i.e., 4) −1) data blocks, i.e., using the data blocks d1 to d3. Then, it writes a new stripe row composed of (number-of-data disks −1) data blocks and the new parity p'x in the disks (S3003).

If the currently-reading stripe row is the final stripe in the LU-allocated area (S3004: Yes), the CPU 1901 creates new parity p'x using the data blocks remaining in the data buffer 1908 (S3005) and writes them in the disks (S3006).

Then, in the RAID group information management table T2, the CPU 1901 reduces the number of data disks in the current RAID group by one (S3007). Also, in the disk information management table T1, it changes the number entered in the RAID group number field for the disk that has become an unused disk as a result of the foregoing stripe row rewriting, to '−1' (spare disk) (S3008), and finishes the processing.

Meanwhile, if the stripe row being currently-read is not the final stripe row (S3004: No), the CPU 1901 returns to step S3001 and repeats the processing.

Figure 14:
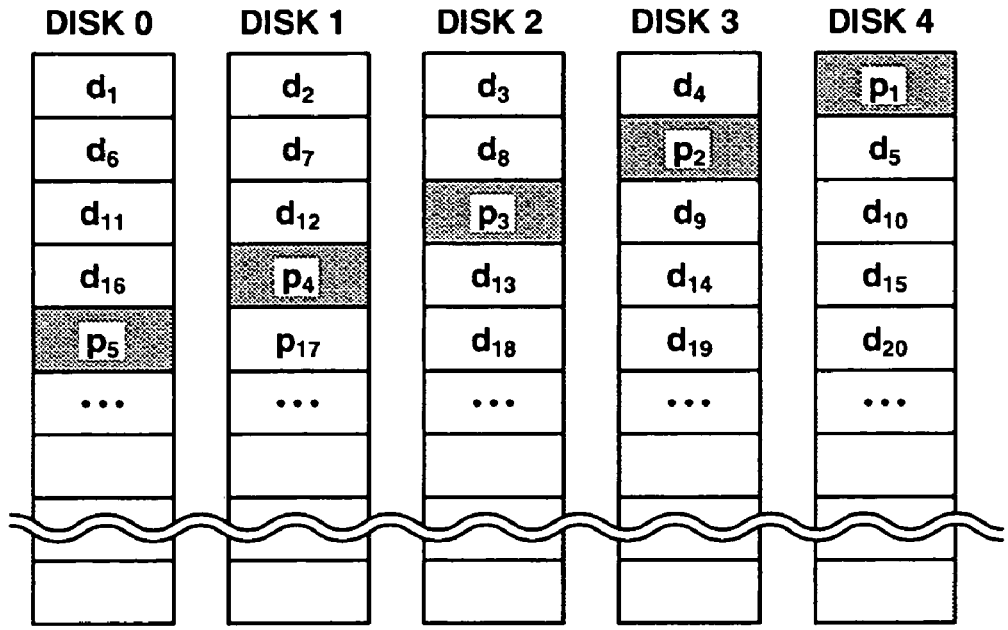
FIG. 14 is a diagram showing the data arrangement before the granularity reduction processing according to Embodiment 1 of this invention is performed.
Figure 15:
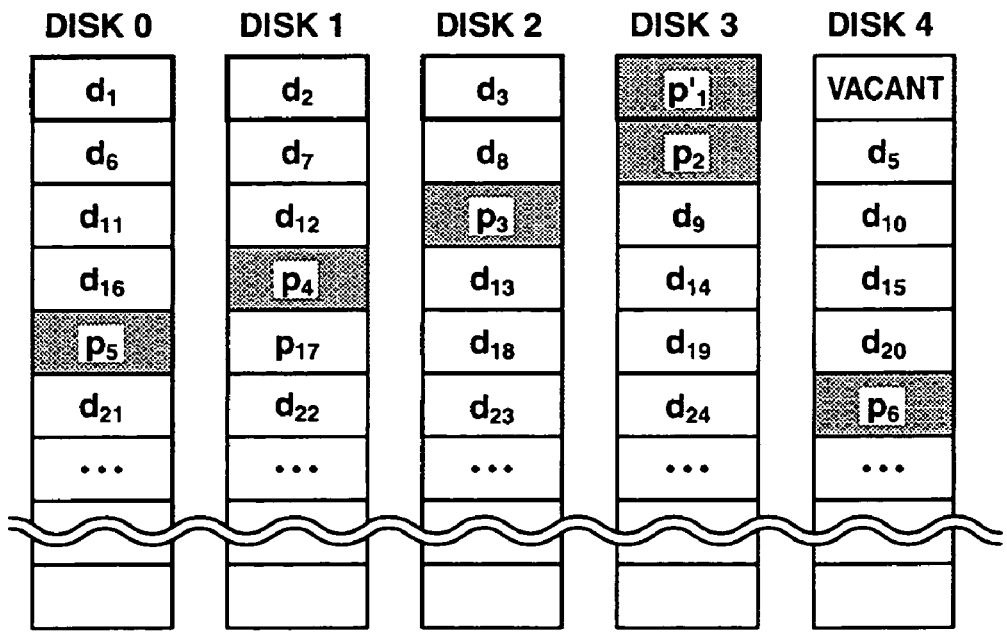
FIG. 15 is a diagram showing the state where the first row is changed to a new stripe row during the granularity reduction processing according to Embodiment 1 of this invention.
Figure 16:
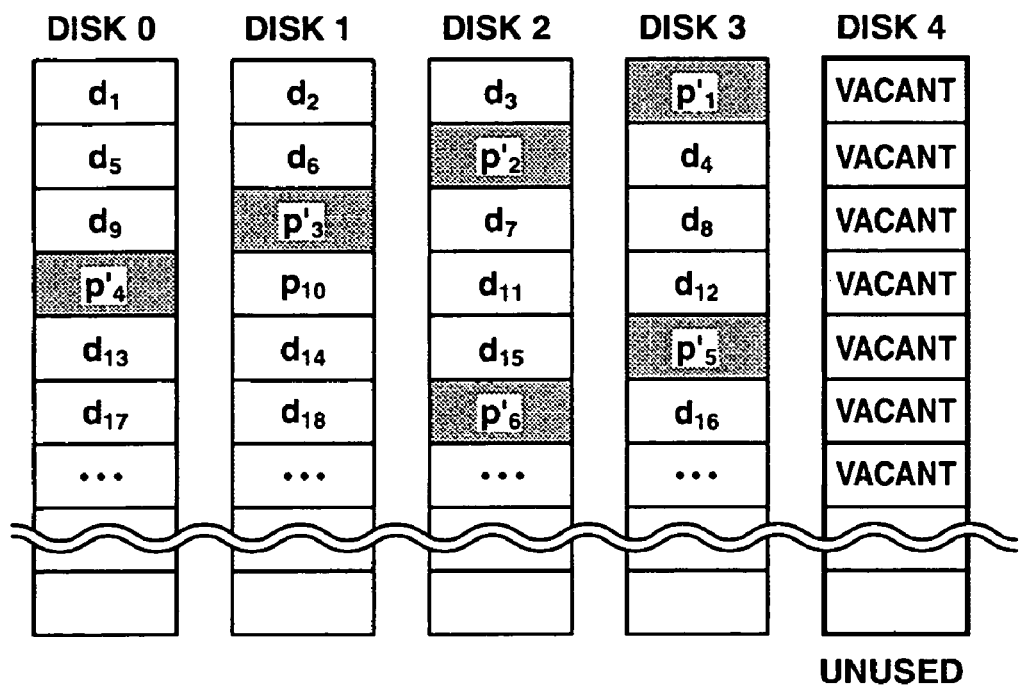
FIG. 16 is a diagram showing the arrangement of data blocks and parity blocks after the granularity reduction processing according to Embodiment 1 of this invention is performed.

FIGS. 14 to 16 show the arrangement of the data blocks d and parity blocks p in the disks during the granularity reduction processing explained with reference to FIG. 13.

FIG. 14 shows the data arrangement before the granularity reduction processing. Here, the data blocks d and parity blocks p are arranged in the disks 0 to 4.

FIG. 15 shows the state where the first row is changed to a new stripe row by the CPU 1901 executing the steps S3000 to S3003. In the new first row, the data blocks d1, d2, and d3 are stored in the disks 0, 1 and 2 respectively, the parity block p'1 is stored in the disk 3, and the block in the disk 4 is 'vacant.'

FIG. 16 shows the arrangement of the data blocks d and parity blocks p after the granularity reduction processing is complete. In the first row, the data blocks d1, d2, and d3 and parity block p'1 are arranged in the disks 0 to 3 respectively and the block in the disk 4 is 'vacant,' i.e., unused. In the second row, the data blocks d3, d4 and d5 and parity block p'2 are arranged in the disks 0 to 3 respectively and the block in the disk 4 is also 'vacant.' In the third and subsequent rows, the blocks in the disk 4 are all 'vacant.' Accordingly, after the CPU 1901 performs the processing from step S3007 to 3008, the disk 4 can be made into a new spare disk.

FIGS. 17 to 19 show the data buffer 1908 during the steps S3000 to S3002.

FIG. 17 shows the state where, in step S3000, the data blocks in the first stripe row, d1, d2, d3 and d4 are read into the data buffer 1908.

FIG. 18 shows the state where, in step S3001, the data blocks in the next stripe row, d5, d6, d7 and d8 are read into the data buffer 1908.

FIG. 19 shows the state where new parity p'1 is created with respect to the data blocks of the number (number-of-data disks −1), i.e., d1, d2 and d3.

As explained above, with the data processing system according to Embodiment 1, even if there is no spare disk, a spare disk can be reserved by carrying out granularity reduction for an existing disk and making the existing disk into a spare disk. Accordingly, the failure resistance of the storage apparatus 1 can be maintained for a long time. Also, because a spare disk is created using the existing disk, the storage apparatus can be compact.

Meanwhile, if there is a possibility that the failure resistance cannot be maintained anymore (i.e., a spare disk can no longer be reserved), the management terminal 2 can be informed of the necessity of a replacement storage apparatus.

2. Embodiment 2

Embodiment 2 of this invention is a method for reserving a new spare disk by changing the RAID level in the storage apparatus 1. For example, RAID-6 (nD+2P) configuration is changed to RAID-5 (nD+1P) configuration to make the disk left in this change a spare disk. This embodiment is explained with reference to FIGS. 20 to 23.

Figure 20:
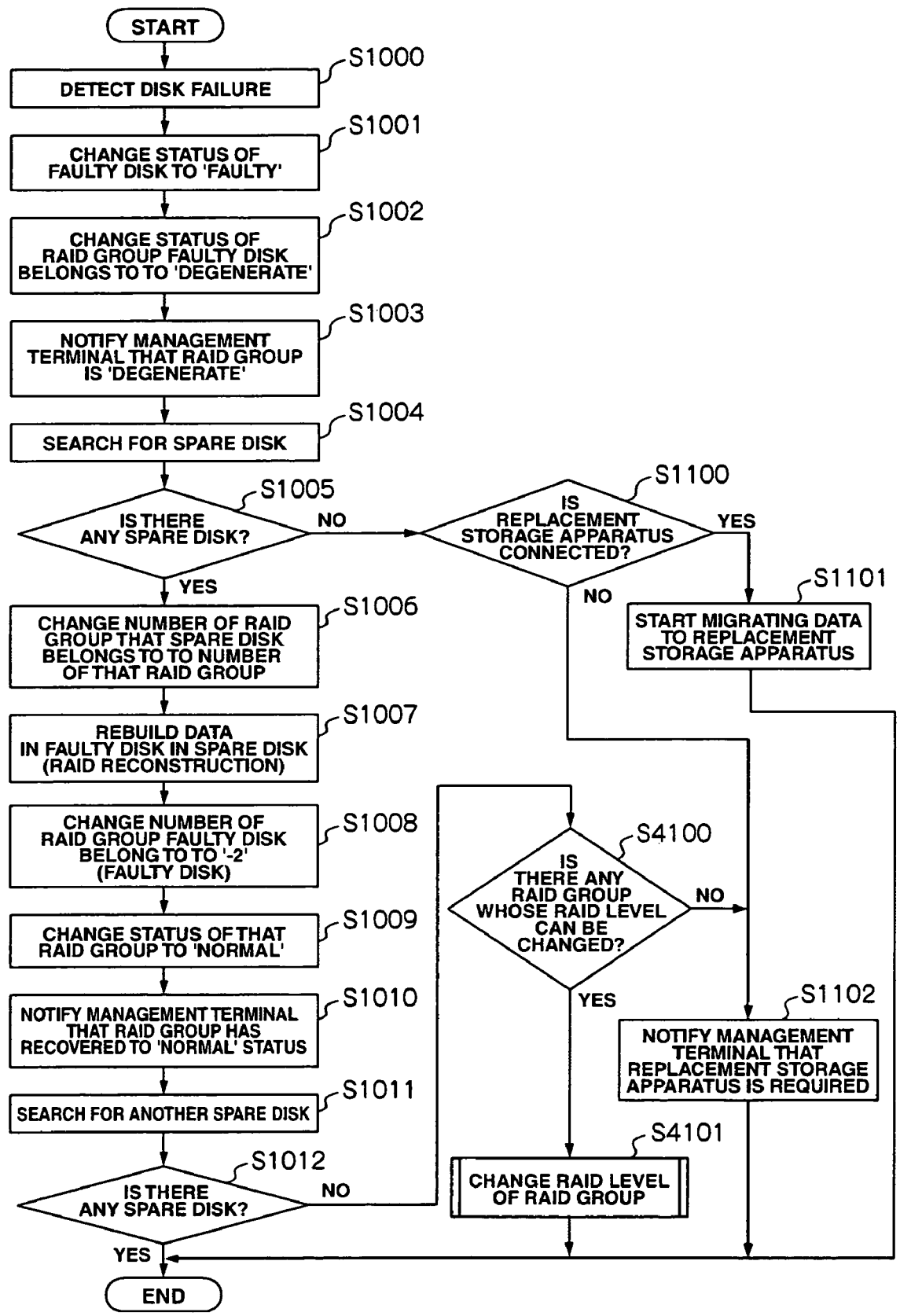
FIG. 20 is a flowchart showing failure recovery and next-spare-disk reservation processing performed when a disk failure occurs, according to Embodiment 2 of this invention.

FIG. 20 is a flowchart showing failure recovery and next-spare-disk reservation processing the CPU 1901 performs based on the control program 1903 and management table 1904 when a disk failure occurs, according to Embodiment 2.

Steps S1000 to S1012 and steps S100 to S102 are the same as those in Embodiment 1 above, so their explanations have been omitted.

If no spare disk is found in the second spare disk search (S1012: No), the CPU 1901 refers to the RAID information management table T2 to judge whether there is a RAID group whose RAID level can be changed, and if there is one (S4100: Yes), it changes its RAID level (S4101). Incidentally, if more than one such RAID group exists, the CPU 1901 selects the RAID group found first or the RAID group for which a high priority has been set by the management terminal 2, and changes its RAID level.

Figure 21:
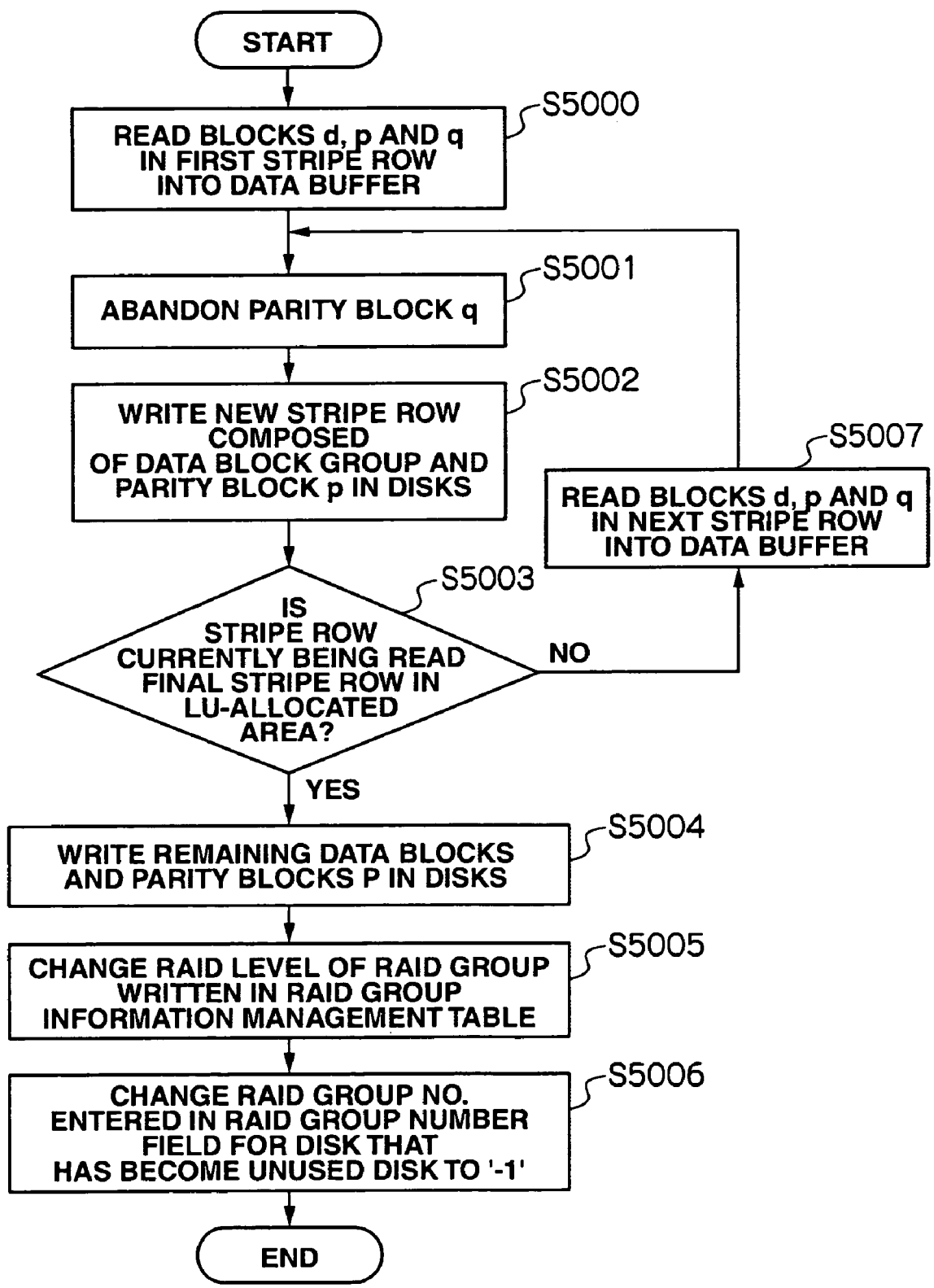
FIG. 21 is a flowchart showing a RAID level change processing routine according to Embodiment 2 of this invention.

FIG. 21 is a flowchart showing a RAID level change routine the CPU 1901 performs based on the control program 1903 and management table 1904, according to Embodiment 2.

Figure 22:
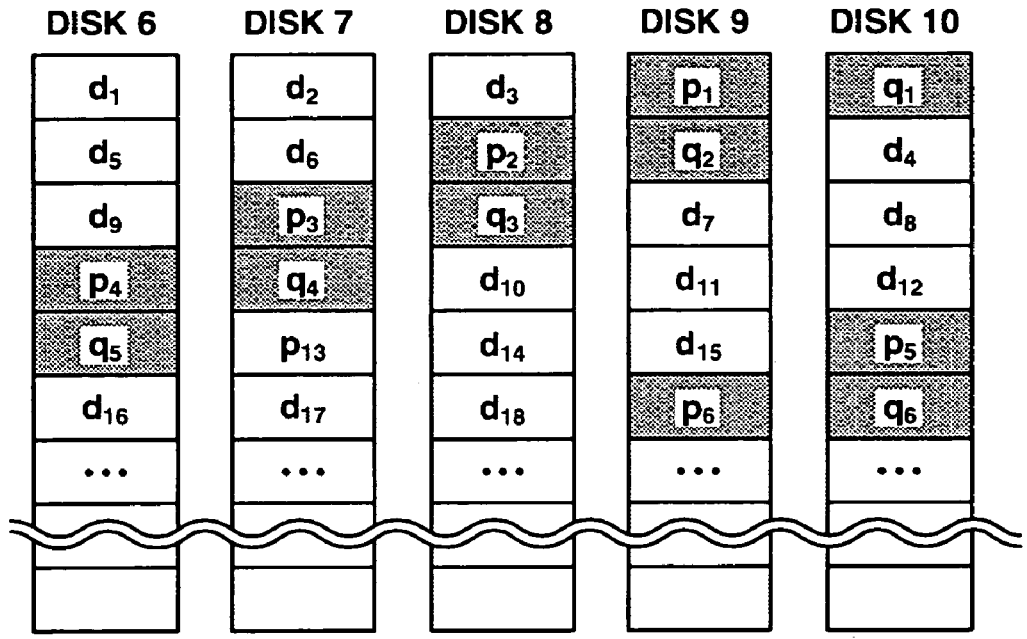
FIG. 22 is a diagram showing the state of RAID groups before RAID level change processing according to Embodiment 2 of this invention is performed.
Figure 23:
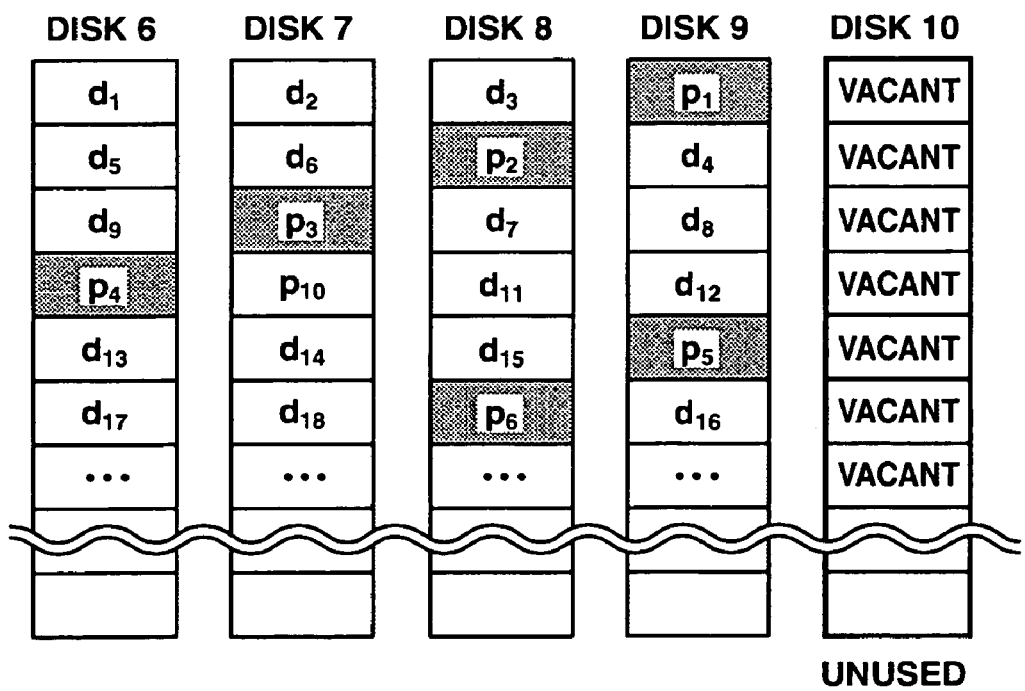
FIG. 23 is a diagram showing the data arrangement after the data configuration is changed to RAID-5 by the RAID level change processing according to Embodiment 2 of this invention.

When the CPU 1901 reads the data blocks d and parity blocks p and q in the first stripe row into the data buffer 1908 (S5000), it abandons the parity block q from the data buffer 1908. For example, from among the data blocks d1, d2, d3 and parity blocks p1 and q1 in the first stripe row stored in the disks 6 to 10 as shown in FIG. 22, the CPU 1901 abandons the parity block q1 as shown in FIG. 23. The CPU 1901 then writes a new stripe row composed of the data blocks d and parity block p in the disks (S5002). If the stripe row currently read into the data buffer 1908 is the final stripe row in the LU-allocated area (S5003: Yes), the CPU 1901 writes the remaining data blocks d and parity blocks p in the disks (S5004).

The CPU 1901 then changes the RAID level of the RAID group written in the RAID group information management table T2 (S5005). It also changes, in the disk information management table T1, the number written in the RAID group number field for the disk that has become an unused disk to '−1' (spare disk) (S5006), and finishes the processing.

Meanwhile, if the stripe row currently read into the data buffer 1908 is not the final stripe row in the LU-allocated area (S5003: No), the CPU 1901 reads the data blocks and parity blocks p and 1 in the next stripe row into the data buffer 1908 (S5007) and returns to step S5001 to repeat the same processing.

FIGS. 22 and 23 are diagrams showing the changes in the data blocks d and parity blocks p and q in the disks according to Embodiment 2.

FIG. 22 shows the state of the RAID group before its RAID level is changed. The RAID group has a RAID-6 data configuration where the data blocks d and two kinds of parity blocks p and q are distributed in the disks 6 to 10, respectively.

FIG. 23 shows the data arrangement after the RAID-6 data configuration is changed to the RAID-5 data configuration through the RAID level change processing shown in FIGS. 19 and 21. Because the RAID-6 (double parity) configuration is changed to RAID-5 configuration, the parity blocks q are abandoned and the data configuration is formed only by the data blocks d and parity blocks p. The data blocks d and parity blocks p are located in the disks 6 to 9 and the disk 10 is 'vacant,' i.e., unused. Accordingly, by the CPU 1901 executing the foregoing steps S5005 and 5006, the disk 10 becomes a spare disk.

As explained above, with the data processing system according to Embodiment 2, even if there is no spare disk, the RAID level is changed so that stable performance can be ensured and a spare disk can be reserved from among the existing disks. Accordingly, the failure resistance of the storage apparatus 1 can be maintained for a long time. Also, because a spare disk can be reserved from among the existing disks, the storage apparatus can be compact.

Meanwhile, if there is a possibility that the failure resistance cannot be maintained anymore (i.e., a spare disk cannot be reserved), the management terminal 2 can be informed of the necessity of a replacement storage apparatus.

3. Embodiment 3

Embodiment 3 of this invention is a method for reserving a spare area as an LU, not as a disk. In Embodiments 1 and 2, the data content of a faulty disk is rebuilt in a physical disk, however, in Embodiment 3, it is rebuilt in an LU, i.e., in a logical disk. A method for reserving an LU as a spare area (hereinafter called a 'spare LU') has an advantage over Embodiments 1 and 2 in that the spare area can be easily reserved without having to move the existing data blocks. However, because access is made by changing an original LU address (LBA) in a faulty disk to an address in a spare LU, the performance may be inferior to that in Embodiments 1 and 2. Embodiment 3 is explained with reference to FIGS. 24 to 27.

Figure 24:
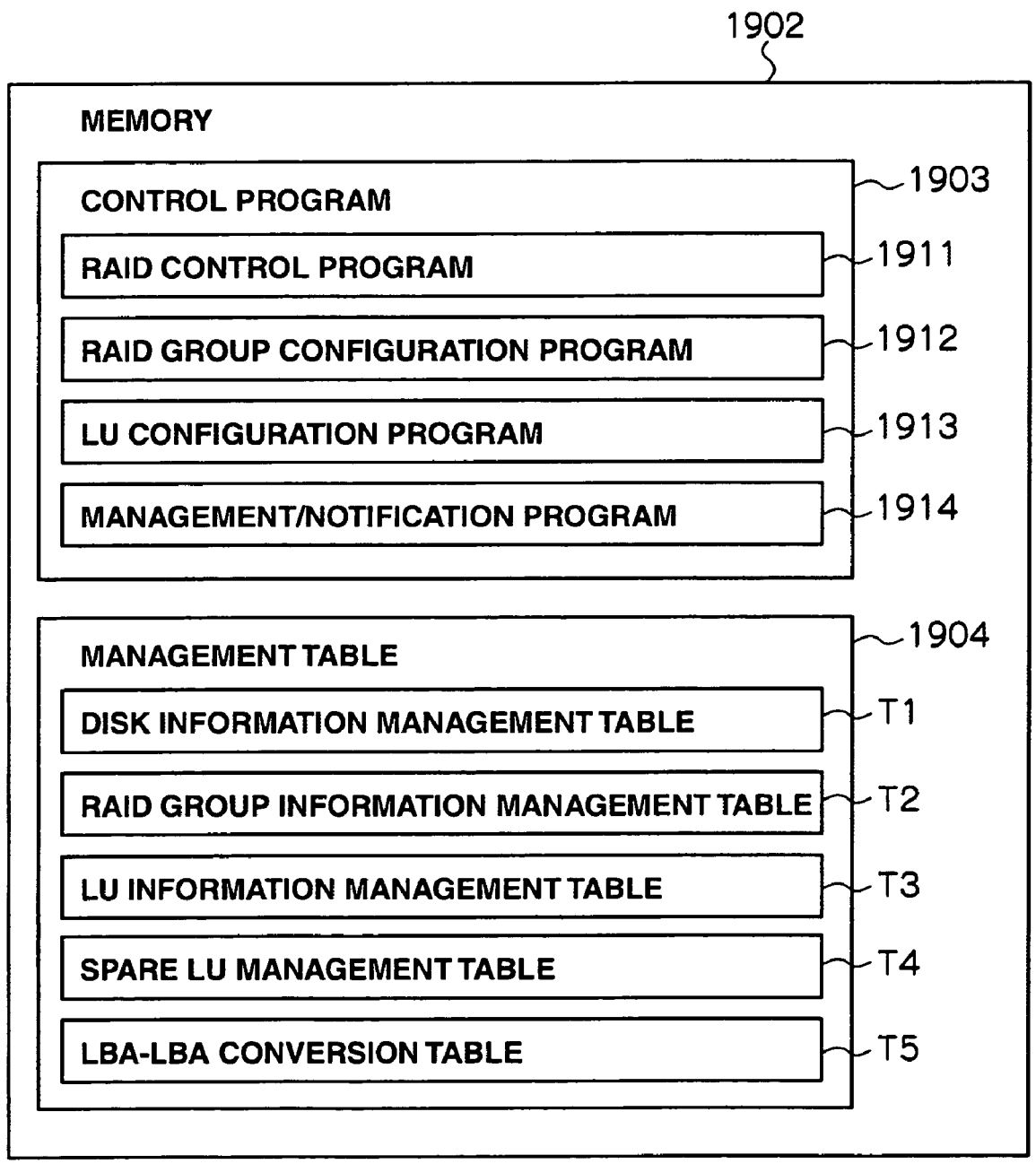
FIG. 24 is an explanatory diagram showing a control program and management table stored in the memory according to Embodiment 3 of this invention.

FIG. 24 is an explanatory diagram showing the control program 1903 and management table 1904 stored in the memory 1902, according to Embodiment 3.

The control program 1903 according to Embodiment 3 is composed of a RAID control program 1911, RAID group configuration program 1912, LU configuration program 1913, and management/notification program 1914.

The management table 1904 is composed of a disk information management table T1, RAID group information management table T2, LU information management table T3, spare LU management table T4 and LBA-LBA conversion table T5.

FIG. 25 is an explanatory diagram of the spare LU management table T4. This table T4 stores information for spare areas provided as LUs. More precisely, it stores, for each spare LU, its number, capacity, the RAID group number of its allocation source RAID group, start LBA, end LBA, and usage status (whether it is 'used' or 'unused'). For example, the spare LU having spare LU number 0 has a capacity of 500 GB, the RAID group number of its allocation source RAID group is 0, its start LBA is 00000000h and its end LBA is 0004F000h, and the usage status is 'unused.'

Incidentally, the spare LU management table T4 and LU information management table T3 are stored in the memory 1902. The information in these tables can be checked via the management terminal 2.

FIG. 26 is an explanatory diagram for the LBA-LBA conversion table T5. This table T5 manages the correspondence between original LU addresses (LBAs) and spare LU addresses (LBAs). More precisely, the table T5 stores access source LU numbers, access source LBAs, spare LU numbers, and access destination LBAs; and manages the LBAs of spare LUs. For example, access to the data in the LBA 00356780h in the access source LU1 is converted to access to the LBA 10004780h in the spare LU0.

Figure 27:
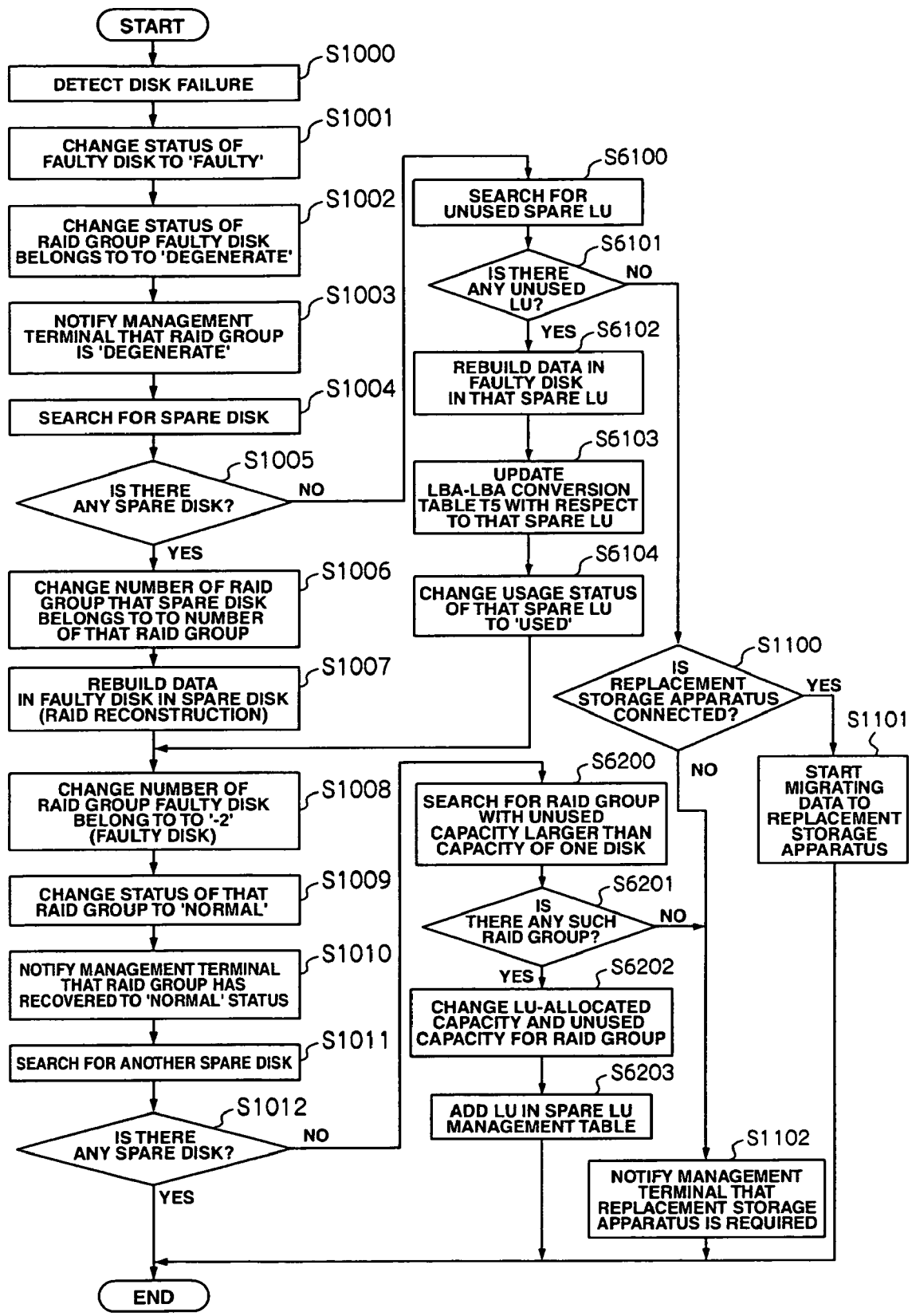
FIG. 27 is a flowchart showing failure recovery and spare LU reservation processing performed when a disk failure occurs, according to Embodiment 3 of this invention.

FIG. 27 is a flowchart showing failure recovery and spare LU reservation processing the CPU 1901 performs based on the control program 1903 and management table 1904 when a disk failure occurs, according to Embodiment 3.

Steps S1000 to S1012 and steps S1100 to S1102 are the same as in the foregoing embodiments, so their explanations will be omitted.

If no spare disk is found in the first spare disk search (S1005: No), the PCU 1901 searches the spare LU management table T4 for an unused spare LU (S6100). If there is an unused spare LU (S6101: Yes), it rebuilds the data in the faulty disk in the spare LU and carries out RAID recovery (S6102).

The CPU 1901 then updates the LBA-LBA conversion table T5 with respect to the foregoing spare LU (S6103). Then, it changes the usage status of the spare LU written in the spare LU management table T4 to 'used' (S6104) and executes the processing following the step S1008.

Meanwhile, if no spare disk is found in the second spare disk search (S1012: No), the CPU 1901 searches the disk information management table T1 and RAID information management table T2 for a RAID group whose unused capacity is larger than the capacity of one disk (S6200). Here, even if an unused LU exists in the RAID group the faulty disk belongs to, the CPU 1901 basically does not use that LU as a spare disk but searches for another LU in another RAID group. However, if it is necessary to use that unused LU as a spare disk, the CPU 1901 assigns that LU as a spare disk as long as the RAID group the faulty disk belongs to includes, in addition to that LU having the capacity corresponding to one disk, unused capacity that can be used even when the RAID group is degenerated.

If such a RAID group is found (S6201: Yes), the CPU 1901 changes, in the RAID information management table T2, the LU-allocated capacity and unused capacity for that RAID group and reserves capacity for the spare LU. More precisely, the CPU 1901 increases the LU-allocated capacity by an amount corresponding to the capacity of one disk, and reduces the unused capacity by the same amount (S6202). For example, if the spare LU needs to have the capacity of 100 GB, the CPU 1901 increases the LU-allocated capacity by 100 GB and decreases the non-allocated capacity by 100 GB in the RAID information management table T2.

The CPU 1901 then registers the LU reserved in step S6202 in the spare LU management table T4 (S6203) and finishes the processing.

As described above, with the data processing system according to Embodiment 3, even if there is no spare disk, a RAID group having an unused capacity equal to or larger than the capacity of one disk is searched for so that a spare LU (spare area) can be reserved from among the existing disks in that RAID group. Accordingly, the failure resistance of the storage apparatus 1 can be maintained for a long time. Moreover, because a spare area can be reserved from among the existing disks, the storage apparatus can be compact.

Furthermore, when there is a possibility that the failure resistance cannot be maintained anymore (i.e., a spare disk cannot be reserved), the management terminal 2 can be informed of the necessity of a replacement storage apparatus.

4. Embodiment 4

Embodiment 4 of this invention is the case where this invention is applied in a storage apparatus where capacity is dynamically allocated.

A storage apparatus that dynamically allocates capacity manages the capacities of a plurality of RAID groups as one capacity pool and dynamically allocates small and equal size of LUs called extents to the places data is actually written. In this storage apparatus, spare areas are formed as a set of unused extents. In Embodiment 3, when reserving a spare LU from a single RAID group, that RAID group has to have unused capacity the same or larger than the capacity of one disk. In Embodiment 4, however, because a spare area is reserved in the extent pool (a set of extents), the spare area does not have to be reserved from among the areas in a single RAID group and it can also be reserved from among discontinuous areas. Embodiment 4 is explained with reference to FIGS. 28 to 35.

Figure 28:
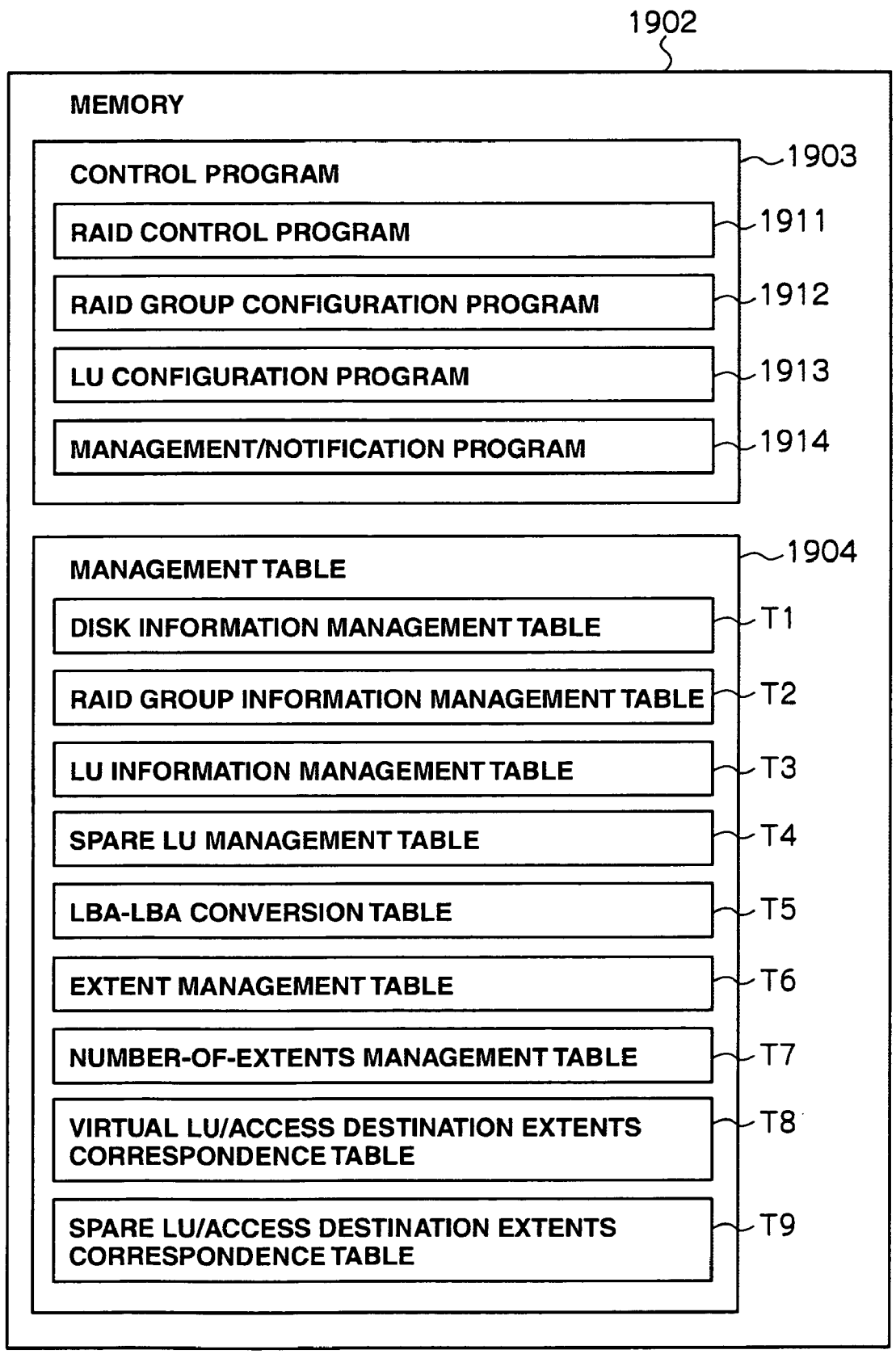
FIG. 28 is an explanatory diagram showing a control program and management table stored in the memory according to Embodiment 3 of this invention.

FIG. 28 is an explanatory diagram showing a control program 1903 and management table 1904 stored in the memory 1902 according to Embodiment 4.

The control program 1903 according to Embodiment 4 is composed of a RAID control program 1911, RAID group configuration program 1912, LU configuration program 1913, and management/notification program 1914.

The management table 1904 is composed of a disk information management table T1, RAID group information management table T2, LU information management table T3, extent management table T6, number-of-extents management table T7, virtual-LU/access destination extent correspondence table T8, and spare LU/extent correspondence table T9.

Figure 29:
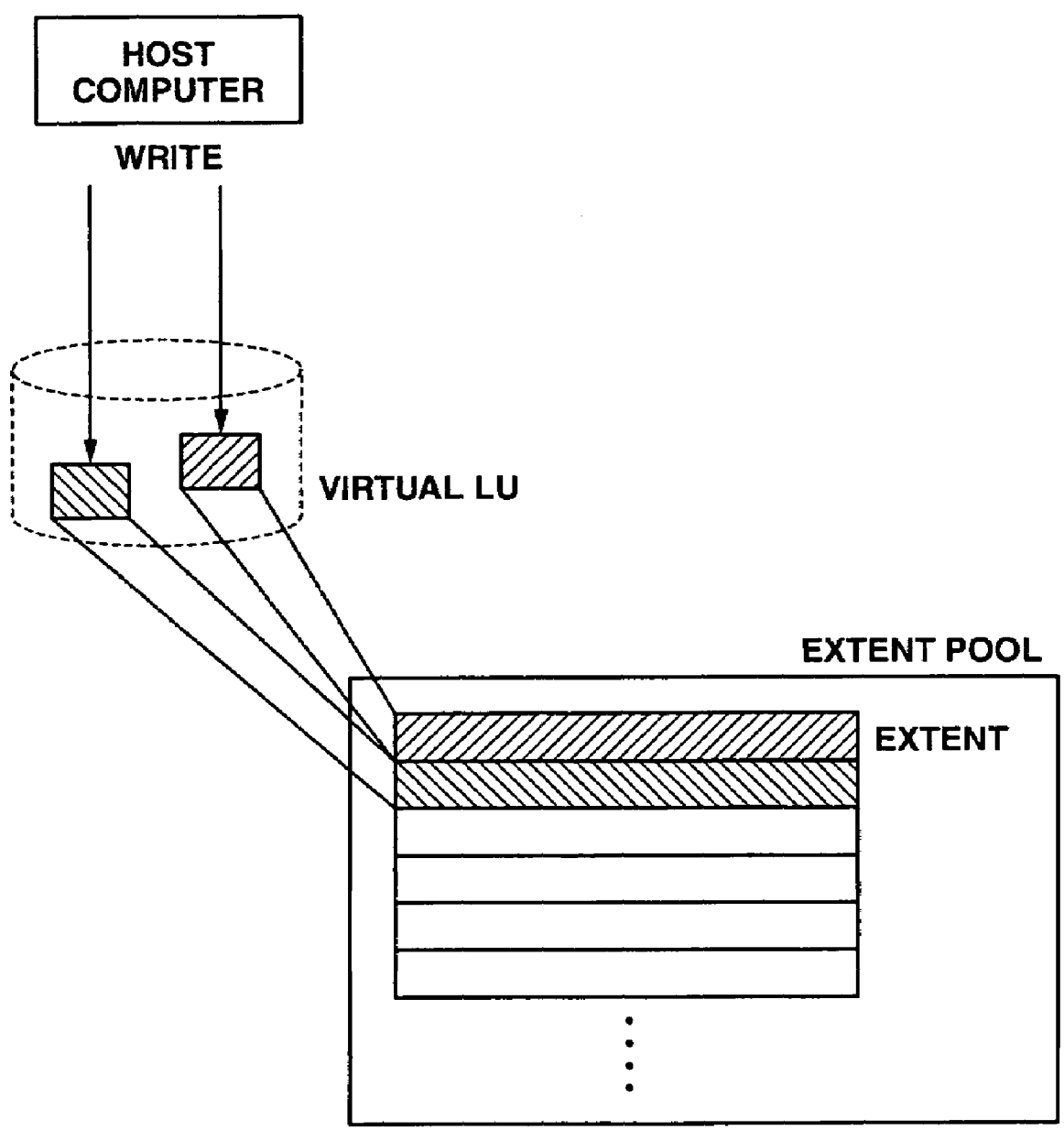
FIG. 29 is a diagram schematically showing the concept of Embodiment 4 of this invention.

FIG. 29 schematically shows the concept of Embodiment 4. The storage apparatus 1 according to Embodiment 4 provides the host computers 3 with virtual LUs having virtual capacities, instead of LUs. When one of the host computers 3 writes data in a virtual LU, the CPU 1901 dispatches (allocates) an extent in the capacity pool to the address where the data is written. Extents are LUs formed by dividing a RAID group, each LU having the same small capacity. The set of extents is managed as one extent pool regardless of differences between RAID groups and the extents are dispatched as needed.

FIG. 30 is an explanatory diagram of the extent management table T6. This table T6 shows the management status of the extent pool and stores various kinds of information for the extents. More precisely, it stores, for each extent, its number, allocation source RAID group number, start LBA, and allocation status (whether the extent is 'allocated' or 'non-allocated'). For example, the extent having the extent number '0' exists in the RAID group 0, its start LBA is 00000000h, and its allocation status is 'allocated.' Incidentally, because the size of an extent is determined in advance, there is no need to specify the address of an end LBA.

The extent management table T6 and RAID information management table T2 are stored in the memory 1902.

FIG. 31 is an explanatory diagram of the number-of-extents management table T7. This table stores the number of extents allocated to virtual LU areas, the number of extents allocated to spare areas, the number of unused extents and total number of extents. For example, in the example in FIG. 30, the number of extents allocated to the virtual LU areas is 200,000,000,000, the number of extents allocated to spare areas is 0, the number of unused extents is 700,000,000,000, and total number of extents is 900,000,000,000.

Incidentally, the number-of-extents management table T7 and extent management table T6 are stored in the memory 1902.

FIG. 32 shows the virtual LU/access destination extent correspondence table T8. This table T8 stores correspondence relationships between the LBAs in the virtual LUs and the dispatched extents. More precisely, the table stores virtual LU numbers, start LBAs of the virtual LUs, and extent numbers. For example, the extent having the extent number 0 is dispatched to the start LBA 00356780h in the virtual LU 0.

The virtual LU/access destination extent correspondence table T8 and extent management table T6 are stored in the memory 1902.

FIG. 33 shows the spare LU/access destination extents correspondence table T9. This table T9 stores spare LU numbers, start LBAs of the spare LUs, and extent numbers. For example, the extent having the extent number 1800 is dispatched to the start LBA 00356780h in the spare LU 0.

Figure 34:
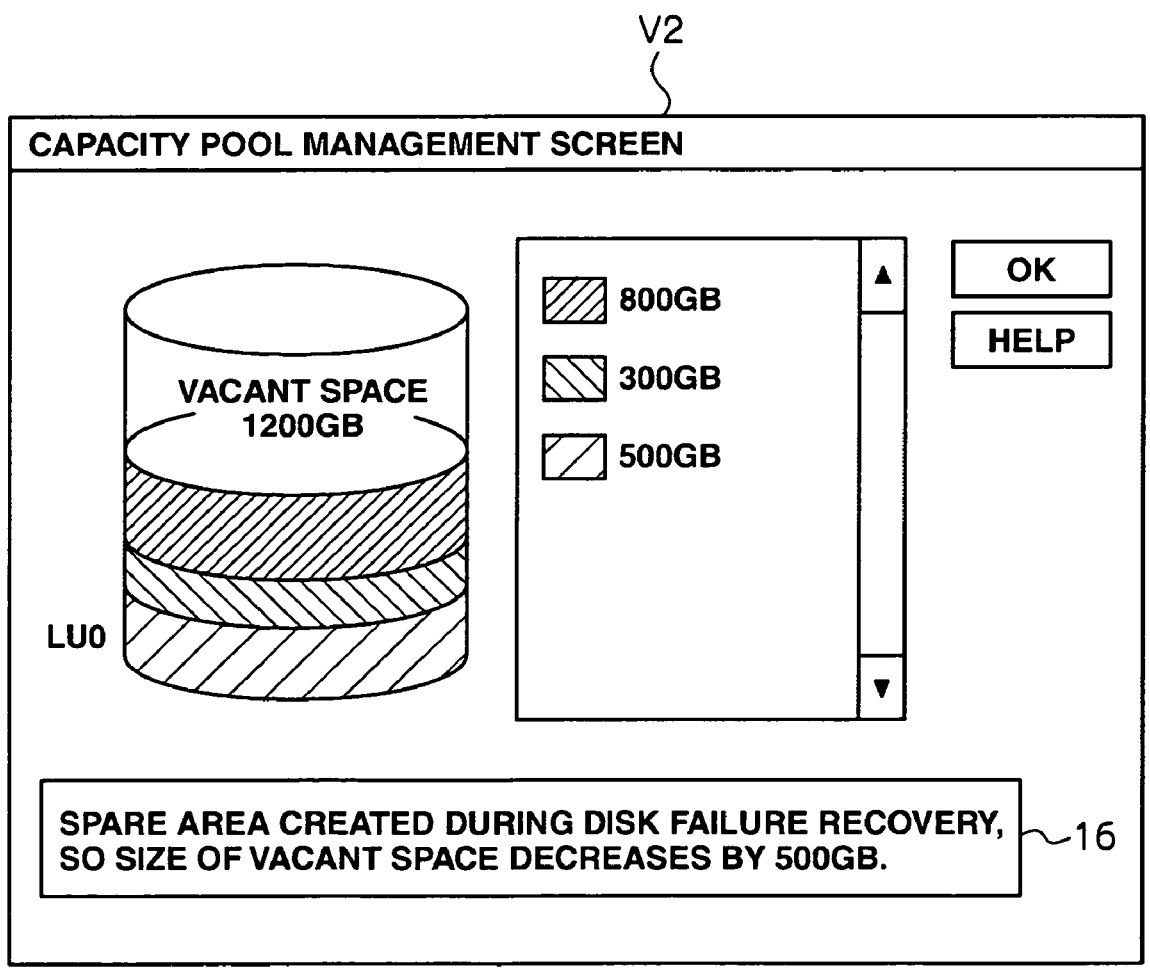
FIG. 34 shows a capacity pool management viewing screen showing the capacity of an extent pool according to Embodiment 4 of this invention.

FIG. 34 shows the capacity pool management viewing screen showing the capacity of the extent pool. The capacity pool management viewing screen V2 can be accessed from the management terminal 2.

The capacity pool management viewing screen V2 shows the capacities of extents allocated to virtual LUs and the capacities of unused extents and indicates the usage rates of the respective virtual LUs in a volume. For example, the virtual LU 0 consumes 500 GB. The total capacity of unused extents is 1200 GB. When more spare areas are reserved and the number of unused extents (unused capacities) has decreased, the capacity pool viewing screen V2 shows a message window 16 showing that fact.

Figure 35:
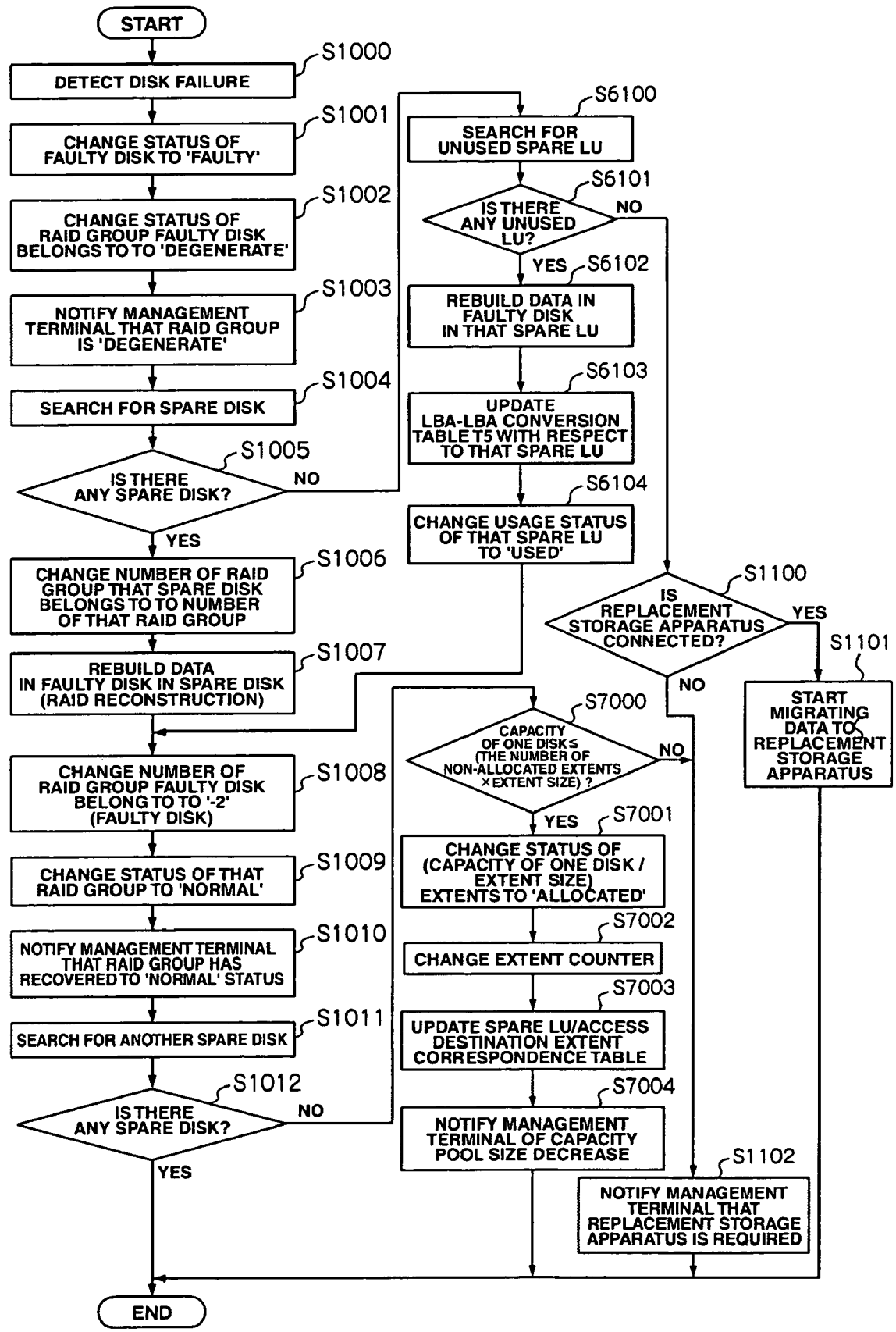
FIG. 35 is a flowchart showing failure recovery and spare LU reservation processing performed when a disk failure occurs, according to Embodiment 4 of this invention.

FIG. 35 is a flowchart showing a routine the CPU 1901 performs based on the control program 1903 and management table 1904 in order to reserve a spare LU area using an extent. Incidentally, the steps S1000 to S1012 and steps S6100 to S6104 and steps 1100 to 1102 are the same as those in the foregoing embodiments, so explanations will be omitted.

The CPU 1901 compares the capacity of one disk with (the number of non-allocated extents multiplied by extent size) and judges whether a spare LU can be reserved in the non-allocated extent group, which is the set of non-allocated extents (S7000). Here, the extent size is a constant previously determined by the CPU 1901.

If the size of the capacity of one disk is the same as (the number of non-allocated extents multiplied by extent size) or smaller than that, i.e., the capacity of one disk ≦(the number of non-allocated extents multiplied by extent size) (S7000: Yes), the CPU 1901 reduces, in the number-of-extents management table T7, the number of non-allocated extents by (the capacity of one disk/extent size), increases the number of extents allocated to spare areas by (the capacity of one disk/extent size), changes the statuses of the extents to 'allocated' (S7001), and changes the extent counter (S7002). In other words, the CPU 1901 changes the allocation status in the extent management table T6 to 'allocated,' reduces the number of unused extents in the number-of-extents management table T7, and increases the number of extents allocated to spare areas.

The CPU 1901 then updates the spare LU/access destination extent correspondence table T9 (S7003). Then, it calls the management/notification program 1914 and notifies the management terminal 2 of the fact that the capacity pool decreases (S7004). This fact is shown on the capacity pool management viewing screen V2 and this processing is complete.

Meanwhile, if there is no unused area corresponding to the capacity of one disk is found in step S7000, i.e., the capacity of one disk>(the number of non-allocated extents multiplied by extent size) (S7000: No), the CPU 1901 calls the management/notification program 1914, notifies the management terminal 2 that a replacement storage apparatus is required (S7005), and finishes the processing.

As explained above, with the data processing system according to Embodiment 4, even if there is no spare disk, a spare area can be reserved dynamically in the extent pool. Accordingly, the failure resistance of the storage apparatus 1 can be maintained for a long time. Moreover, because a spare area can be reserved from among the existing disks, the storage apparatus 1 can be compact.

Furthermore, even when there is a possibility that the failure resistance cannot be maintained anymore (i.e., a spare disk cannot be reserved), the management terminal 2 can be informed of the necessity of a replacement storage apparatus.

5. Embodiment 5

Embodiments 1 to 4 have been explained for the case where the storage apparatus has a search unit that carries out the steps S1000 to S1012; and a reservation unit that dynamically reserves a memory area when failure occurs in one of a plurality of first memory areas—data blocks and parity blocks, and the data stored in that area is migrated to a second memory area—a spare disk or spare area. However, this invention is not limited to this case and it is also possible to store the data destined to be stored in a faulty memory area in a spare disk or spare area.

This invention can be widely applied to one or more storage apparatuses or a data processing system having one or more storage apparatuses.

What is claimed is:

1. A data processing system comprising: a host system; and a storage apparatus that provides one or more first memory areas storing data read/written by the host system, wherein the storage apparatus includes a reservation unit that executes, when any one of the memory areas is determined to be faulty, a first search that searches for a spare memory area that serves as a replacement for the faulty memory area, and, if a snare memory area is found in the first search, rebuilds a content of the faulty memory area in the snare memory area and then executes a second search that searches for a second spare memory area, and, if no second spare memory area is found in the second search, dynamically reserves one of the memory areas as the second spare memory area.

2. A data processing system according to claim 1, wherein the reservation unit executes an operation that, when a spare area cannot be dynamically reserved after the second search, a notification that the faulty disk has been replaced with a new disk is prepared.

3. The data processing system according to claim 2, wherein the first memory areas constitute a logical volume and the reservation unit migrates the data previously stored in one of the first memory areas to another memory area from among the first memory areas, thereby reserves a second memory area in the logical volume.

4. The data processing system according to claim 2, wherein the first memory areas also constitute a logical volume storing parity data and the reservation unit deletes the parity data, thereby reserving a second memory area in that logical volume.

5. The data processing system according to claim 2, wherein the first memory areas constitute a plurality of logical volumes and the reservation unit reserves an unused logical volume with no data from among the logical volumes as a second memory area.

6. A data processing system according to claim 5, wherein the reserved spare area serving as the second spare memory area is reserved while avoiding a RAID group which a faulty disk belongs to.

7. The data processing system according to claim 2, wherein the first memory areas constitute a dynamically-expandable virtual volume, one of the first memory areas accessed by the host system constitutes a dynamically-expandable pool volume, and the reservation unit reduces the size of the pool volume to reserve a second memory area.

8. A data processing method performed in a data processing system comprising a host system and a storage apparatus that provides one or more first memory areas for storing data read/written by the host system, the method comprising:
a step where the storage apparatus executes, when any one of the memory areas is determined to be faulty, a first search that searches for a spare memory area that serves as a replacement for the faulty memory area, and, if a spare memory area is found in the first search, rebuilds a content of the faulty memory area in the spare memory area and then executes a second search that searches for a second spare memory area, and, if no second spare memory area is found in the second search, dynamically reserves one of the memory areas as the second spare memory area.

9. The data processing system according to claim 8, wherein when a spare area cannot be dynamically reserved after the second search, a notification that the faulty disk has been replaced with a new disk is prepared.

10. The data processing method according to claim 9, wherein the first memory areas constitute a logical volume and, in the reservation step, the data previously stored in one of the plurality of first memory areas is migrated to another memory area from among the plurality of first memory areas, thereby reserving a second memory area in the logical volume.

11. The data processing method according to claim 9, wherein the first memory areas also constitute a logical volume storing parity data and, in the reservation step, the parity data is deleted to reserve a second memory area in that logical volume.

12. The data processing method according to claim 9, wherein the first memory areas constitute a plurality of logical volumes and, in the reservation step, an unused logical volume with no data from among the logical volumes is reserved as a second memory area.

13. The data processing system according to claim 12, wherein the reserved spare area serving as the second spare memory area is reserved while avoiding a RAID group which a faulty disk belongs to.

14. The data processing method according to claim 9, wherein the first memory areas constitute a dynamically-expandable virtual volume, one of the first memory areas accessed by the host system constitutes a dynamically-expandable pool volume, and, in the reservation step, the size of the pool volume is reduced and a second memory area is reserved.

15. A storage apparatus for providing one or more first memory areas for storing data read/written by a host system, comprising:
 a reservation unit that executes, when any one of the memory areas is determined to be faulty, a first search that searches for a spare memory area that serves as a replacement for the faulty memory area, and, if a spare memory area is found in the first search, rebuilds a content of the faulty memory area in the spare memory area and then executes a second search that searches for a second spare memory area, and, if no second spare memory area is found in the second search, dynamically reserves one of the memory areas as the second spare memory area.

16. The storage area according to claim 15, wherein the reservation unit executes an operation that, when a spare area cannot be dynamically reserved after the second search, a notification that the faulty disk has been replaced with a new disk is prepared.

17. The storage apparatus according to claim 16,
wherein the first memory areas constitute a logical volume; and
the reservation unit migrates the data previously stored in one of the first memory areas to another memory area from among the first memory areas, thereby reserving a second memory area in the logical volume.

18. The storage apparatus according to claim 16,
wherein the first memory areas also constitute a logical volume storing parity data; and
the reservation unit deletes the parity data to reserve a second memory area in that logical volume.

19. The storage apparatus according to claim 16,
wherein the first memory areas constitute a plurality of logical volumes; and
the reservation unit reserves an unused logical volume with no data from among the logical volumes as a second memory area.

20. The storage apparatus according to claim 16,
wherein the first memory areas constitute a dynamically-expandable virtual volume;
one of the first memory areas accessed by the host system constitutes a dynamically-expandable pool volume; and
the reservation unit reduces the size of the pool volume and a second memory area is reserved.

21. The storage apparatus according to claim 15, wherein the reserved spare area serving as the second spare memory area is reserved while avoiding a RAID group which a faulty disk belongs to.

* * * * *